United States Patent
Kahan et al.

(10) Patent No.: US 12,240,866 B2
(45) Date of Patent: Mar. 4, 2025

(54) TRANSITION METAL DIMER COMPLEX AS A CATALYST

(71) Applicant: JOHNSON MATTHEY PUBLIC LIMITED COMPANY, London (GB)

(72) Inventors: Rachel Kahan, Cambridge (GB); Mateusz Pitak, Cambridge (GB); Carin Seechurn, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 533 days.

(21) Appl. No.: 17/753,700

(22) PCT Filed: Aug. 3, 2020

(86) PCT No.: PCT/GB2020/051858
§ 371 (c)(1),
(2) Date: Mar. 11, 2022

(87) PCT Pub. No.: WO2020/229848
PCT Pub. Date: Nov. 19, 2020

(65) Prior Publication Data
US 2022/0356200 A1 Nov. 10, 2022

(30) Foreign Application Priority Data
Dec. 19, 2019 (GB) .................... 1918871

(51) Int. Cl.
*C07F 17/02* (2006.01)
*B01J 31/24* (2006.01)
*C07F 15/00* (2006.01)

(52) U.S. Cl.
CPC .......... *C07F 17/02* (2013.01); *B01J 31/2404* (2013.01); *C07F 15/0066* (2013.01)

(58) Field of Classification Search
CPC .... C07F 15/0066; B01J 31/2404; B01J 31/30; B01J 2531/824; B01J 2531/847
See application file for complete search history.

(56) References Cited

FOREIGN PATENT DOCUMENTS

| | | |
|---|---|---|
| JP | 2017526621 A | 9/2017 |
| JP | 2017527526 A | 9/2017 |
| JP | 2021521099 A | 8/2021 |
| WO | 2018/073559 A1 | 4/2018 |

OTHER PUBLICATIONS

A. R. Hajipour, et al., 24(02) Synlett, 254-258 (2013)("Hajipour") (Year: 2013).*
Abdol Hajipour, et al., "The [RPPh3] 2 [Pd2X6] as a Catalyst Precursor for the Heck Cross-Coupling Reaction by In situ Formation of Stabilized Pd(0) Nanoparticles", SYNLETT, vol. 24, No. 02, Jan. 14, 2013 (Jan. 14, 2013), pp. 254-258, XP55733395, DEISSN: 0936-5214, DOI:10.1055/s-0032-1317963abstract; figure 1, p. 254, right-hand column, last paragraph.
Carin C. C. Johansson Seechurn, et al., "Understanding the Unusual Reduction Mechanism of Pd(II) to Pd(I): Uncovering Hidden Species and Implications in Catalytic Cross-Coupling Reactions", Journal of the American Chemical Society, vol. 139, No. 14, Apr. 3, 2017 (Apr. 3, 2017), pp. 5194-5200, XP55698600, US ISSN: 0002-7863, DOI: 10.1021/jacs.7b01110 Schemes 2 and 3; p. 5196; figure 3.
Sylvie Baig, et al., "Synthesis and Theoretical Study of a Series of Dipalladium(I) Complexes Containing the Pd 2 ([mu]-CO) 2 Core", Inorganic Chemistry, vol. 45, No. 5, Mar. 1, 2006 (Mar. 1, 2006), pp. 1935-1944, KP55733401, Easton, US ISSN: 0020-1669, DOI: 10.1021/ic050910n p. 1936, right-hand column, line 12-line 24.
Keith B. Dillon, et al., "Some Reactions of Phosphine Complexes of Platinum(0) and Palladium(0) with Acidic Solvents ; a Phosphorus-31 Nuclear Magnetic Resonance Study", J. Chem. Soc., Dalton Trans., Jan. 1, 1975 (Jan. 1, 1975), pp. 790-794, XP055726045, p. 1975, left-hand column, last paragraph.
Journal of the Chemical Society, Dalton Transactions: Inorganic Chemistry, vol. 9, (1972-1999) (1975), "Some reactions of phosphine complexes of platinum(0) and palladium(0) with acidic solvents. Phosphorus-31 nuclear magnetic resonance study", pp. 790-794. see the preparation of [Ph3PH]i [Pd2Cl6] at p. 791.
Ghorbani-Choghamarani, et al., "Bis[(2-methylacetatobenzyl)tri(p-tolyl)phosphonium]hexabromodipalladate(II); synthesis, characterization, structural study and application as a retrievable heterogeneous catalyst for the amination of aryl halides and Stille cross-coupling reaction", Inorganica Chimica Acta, vol. 446, pp. 97-102, May 1, 2016.

* cited by examiner

*Primary Examiner* — Alexander R Pagano
*Assistant Examiner* — Frank S. Hou
(74) *Attorney, Agent, or Firm* — BakerHostetler

(57) ABSTRACT

A compound of formula (I) wherein M is Pd(II) or Ni(II); X is a halide; $R_1$ and $R_2$ are independently organic groups having 1-20 carbon atoms, or $R_1$ and $R_2$ are linked to form a ring structure with the phosphorus atom; $R_3$ is an organic group having 1-20 carbon atoms; provided that $R_1$, $R_2$, $R_3$ are not each phenyl.

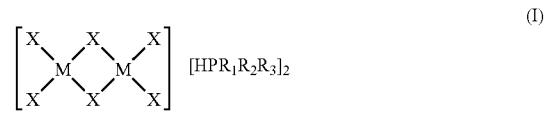

(I)

12 Claims, 4 Drawing Sheets

[HtBuXPhos]$_2$[Pd$_2$Cl$_6$]

TRANSITION METAL DIMER COMPLEX AS A CATALYST

FIELD OF THE INVENTION

The present invention relates to transition metal complexes and in particular to metal (II) dimer complexes. The invention further relates to a process for preparing the complexes and their use to catalyse cross-coupling reactions.

BACKGROUND OF THE INVENTION

Palladium (II) complexes comprising phosphine ligands are known as active catalysts for cross-coupling reactions. For example, the catalysts $PdCl_2(AmPhos)_2$, AmPhosPd (crotyl)Cl, XPhosPd(crotyl)Cl, Ru PhosPd(crotyl)Cl and [BrettPhosPd(crotyl)]OTf are available commercially by Johnson Matthey PLC.

Palladium (II) dimers are also known to be useful in certain cross-coupling reactions. For example, Naghipour et al (Polyhedron 105 (2016) 18-26) show that $[Pd_2Br_6]$ $[Ph_3PCH_2C_6H_4CH_2OC(O)CH_3]_2$ can be used for the Stille cross-coupling reaction. Evans et al (J. Chem. Soc., Dalton Trans., 2002, 2207-2212) disclose $[Pd_2I_6][NEt_3H]_2$ formed in-situ and is used as a precatalyst.

The inventors have developed alternative palladium (II) complexes which have simple routes of preparation using greener solvents.

SUMMARY OF THE INVENTION

The invention provides a compound of formula (I)

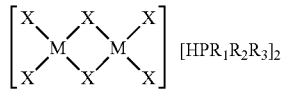  (I)

wherein:
M is Pd(II) or Ni(II);
X is a halide;
$R_1$ and $R_2$ are independently organic groups having 1-20 carbon atoms, or $R_1$ and $R_2$ are linked to form a ring structure with the phosphorus atom;
$R_3$ is an organic group having 1-20 carbon atoms;
provided that $R_1$, $R_2$, $R_3$ are not each phenyl.

The invention further provides a process for the preparation of a compound of formula (IA)

  (IA)

wherein M, $R_1$, $R_2$ and $R_3$ are as hereinbefore defined, said process comprising the step of reacting a compound of formula $H_2PdCl_4$ with ligand $PR_1R_2R_3$ or a salt thereof.

The invention further provides a process for the preparation of a compound of formula (IB)

  (IB)

wherein M, $R_1$, $R_2$ and $R_3$ are as hereinbefore defined and X' is bromide, iodide or fluoride, said process comprising the step of reacting a compound of formula $H_2PdCl_4$ with ligand $PR_1R_2R_3$ or a salt thereof and a compound ZX' wherein Z is hydrogen or a metal.

The invention further provides a process for carrying out a carbon-carbon coupling reaction in the presence of a catalyst, the process comprising the use of a compound of formula (I) as hereinbefore defined. Alternatively, the invention provides the use of a compound of formula (I) as hereinbefore defined to catalyse a carbon-carbon coupling reaction.

The invention further provides a process for carrying out a carbon-heteroatom coupling reaction, the process comprising the use of a compound of formula (I) as hereinbefore defined. Alternatively, the present invention provides the use of a compound of formula (I) as hereinbefore defined to catalyse a carbon-heteroatom coupling reaction.

DEFINITIONS

Figure 1:
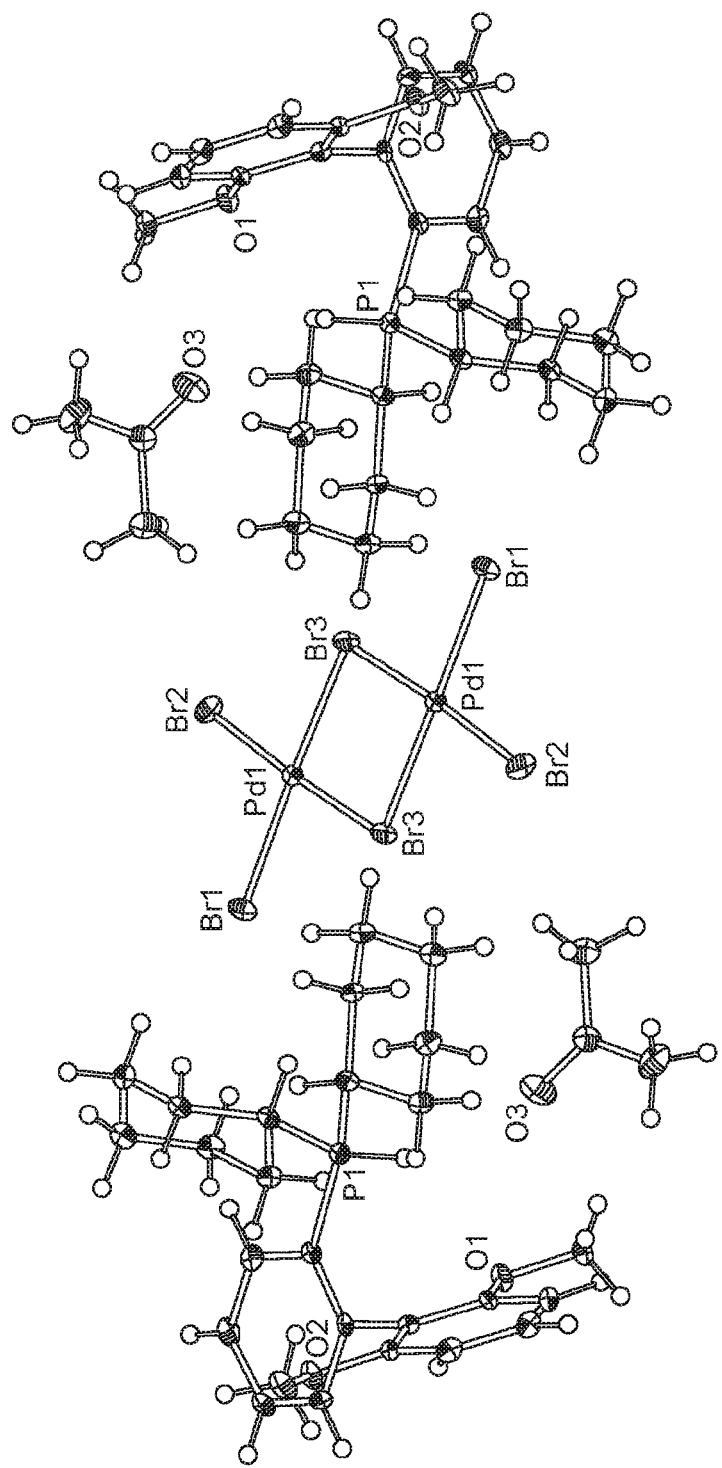
FIG. 1 shows the crystal structure of $[HSPhos]_2[Pd_2Br_6]$.

The point of attachment of a moiety or substituent is represented by "-". For example, —OH is attached through the oxygen atom.

"Alkyl" refers to a straight-chain or branched saturated hydrocarbon group. In certain embodiments, the alkyl group has from 1-20 carbon atoms. In other embodiments, the alkyl group has from 1-15 carbon atoms. In other embodiments, the alkyl group has from 1-8 carbon atoms. Unless otherwise specified, the alkyl group is attached at any suitable carbon atom. The alkyl group may be unsubstituted. Alternatively, the alkyl group may be substituted at any suitable carbon atom. Examples of alkyl groups include, but are not limited to, methyl, ethyl, n-propyl, iso-propyl, n-butyl, iso-butyl, sec-butyl, tert-butyl, n-pentyl, n-hexyl and the like.

"Alkoxy" refers to an optionally substituted group of the formula alkyl-O— or cycloalkyl-O—, wherein alkyl and cycloalkyl are as herein defined.

"Alkoxyalkyl" refers to an optionally substituted group of the formula alkoxy-alkyl-, wherein alkoxy and alkyl are as herein defined.

"Cycloalkyl" refers to a saturated carbocyclic hydrocarbon radical. The cycloalkyl group may have a single ring or multiple condensed rings. In certain embodiments, the cycloalkyl group has from 3-15 carbon atoms. In other embodiments the cycloalkyl group has from 3-10 carbon atoms. In other embodiments, the cycloalkyl group has from 6-10 carbon atoms. Unless otherwise specified, the cycloalkyl group is attached at any suitable carbon atom. The cycloalkyl group may be unsubstituted. Alternatively, the cycloalkyl group may be substituted at any suitable carbon atom. Examples of cycloalkyl groups include, but are not limited to, cyclopropyl, cyclobutyl, cyclopentyl, cyclohexyl, adamantyl and the like.

"Aryl" refers to an aromatic carbocyclic group. The aryl group may have a single ring or multiple condensed rings. In certain embodiments, the aryl group has from 6-20 carbon atoms. In other embodiments, the aryl group has from 6-15 carbon atoms. In other embodiments, the aryl group has from 6-12 carbon atoms. Unless otherwise specified, the aryl group is attached at any suitable carbon atom. The aryl group may be unsubstituted. Alternatively, the aryl group may be substituted at any suitable carbon atom. Examples of aryl groups include, but are not limited to, phenyl, naphthyl, anthracenyl and the like.

"Arylalkyl" refers to an optionally substituted group of the formula aryl-alkyl-, where aryl and alkyl are as herein defined.

"Coupling" refers to a chemical reaction in which two molecules or parts of a molecule join together (Oxford Dictionary of Chemistry, Sixth Edition, 2008).

"Halo", "halide" or "hal" refers to —F, —Cl, —Br and —I.

"Heteroalkyl" refers to an alkyl group (wherein alkyl is herein defined) wherein one or more carbon atoms are independently replaced with one or more heteroatoms (e.g. nitrogen, oxygen, phosphorus and/or sulphur atoms). Unless otherwise specified, the heteroalkyl group is attached at any suitable atom. The heteroalkyl group may be unsubstituted. Alternatively, the heteroalkyl group may be substituted at any suitable atom. Examples of heteroalkyl groups include, but are not limited to, ethers, thioethers, primary amines, secondary amines, tertiary amines and the like.

"Heterocycloalkyl" refers to a cycloalkyl group (wherein cycloalkyl is herein defined) wherein one or more carbon atoms are independently replaced with one or more heteroatoms (e.g. nitrogen, oxygen, phosphorus and/or sulphur atoms). Unless otherwise specified, the heterocycloalkyl group is attached at any suitable atom. The heterocycloalkyl group may be unsubstituted. Alternatively, the heterocycloalkyl group may be substituted at any suitable atom. Examples of heterocycloalkyl groups include, but are not limited to, epoxide, morpholinyl, piperadinyl, piperazinyl, thirranyl, pyrrolidinyl, pyrazolidinyl, imidazolidinyl, thiazolidinyl, thiomorpholinyl and the like.

"Heteroaryl" refers to an aryl group (wherein aryl is herein defined) wherein one or more carbon atoms are independently replaced with one or more heteroatoms (e.g. nitrogen, oxygen, phosphorus and/or sulphur atoms). Unless otherwise specified, the heteroaryl group is attached at any suitable atom. The heteroaryl group may be unsubstituted. Alternatively, the heteroaryl group may be substituted at any suitable atom. Examples of heteroaryl groups include, but are not limited to, thienyl, furanyl, pyrrolyl, imidazolyl, pyrazolyl, thiazolyl, isothiazolyl, oxazolyl, isoxazolyl, triazolyl, thiadiazolyl, thiophenyl, oxadiazolyl, pyridinyl, pyrimidyl, benzoxazolyl, benzthiazolyl, benzimidazolyl, indolyl, quinolinyl and the like.

"Metallocenyl" refers to a transition metal complex group wherein a transition metal atom or ion is "sandwiched" between two rings of atoms. The metallocenyl group may be substituted or unsubstituted. Unless otherwise specified, the metallocenyl group may be attached at any suitable atom and, if substituted, may be substituted at any suitable atom. Examples of transition metal atoms or ions include but are not limited to chromium, manganese, cobalt, ruthenium, osmium, nickel and iron. Any example of a suitable ring of atoms is a cyclopentadienyl ring. An example of a metallocenyl group includes, but is not limited to, ferrocenyl, which comprises a Fe(II) ion sandwiched between two cyclopentadienyl rings, wherein each cyclopentadienyl ring may be independently unsubstituted or substituted.

"Substituted" refers to a group in which one or more hydrogen atoms are each independently replaced with substituents (e.g. 1, 2, 3, 4, 5 or more) which may be the same or different. Unless the context demands otherwise, all groups defined above and referred to below may be unsubstituted or substituted where substitution is possible.

DETAILED DESCRIPTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The invention provides a compound of formula (I)

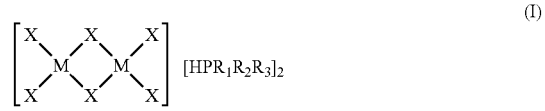

wherein:

M is Pd(II) or Ni(II);

X is a halide;

$R_1$ and $R_2$ are independently organic groups having 1-20 carbon atoms, or $R_1$ and $R_2$ are linked to form a ring structure with the phosphorus atom;

$R_3$ is an organic group having 1-20 carbon atoms;

provided that $R_1$, $R_2$, $R_3$ are not each phenyl.

Preferably, M is Pd.

X is suitably Cl, Br or I; more suitably Cl or Br.

In one embodiment, $R_1$ and $R_2$ are the same.

In an alternative embodiment, $R_1$ and $R_2$ are different.

In one embodiment of the invention, $R_1$ and $R_2$ are linked to form a ring structure with the P atom to which they are attached. Suitably, the ring structure is a 4-7 membered ring.

Suitably, $R_1$ and $R_2$ are independently selected from the group consisting of alkyl, cycloalkyl, aryl, and heteroaryl wherein the heteroatoms are independently selected from sulphur, nitrogen and oxygen.

More suitably, $R_1$ and $R_2$ are independently selected from the group consisting of alkyl, cycloalkyl and aryl.

Examples of suitable alkyl groups for $R_1$ or $R_2$ include methyl, ethyl, n-propyl, iso-propyl, n-butyl, iso-butyl, sec-butyl, tert-butyl, pentyl (e.g. n-pentyl or neopentyl), hexyl, heptyl, octyl, nonyl, decyl, dodecyl or stearyl (all either unsubstituted or substituted).

Examples of suitable cycloalkyl groups for $R_1$ or $R_2$ include cyclopropyl, cyclobutyl, cyclopentyl, cyclohexyl or adamantyl (all either unsubstituted or substituted). Examples of suitable aryl groups for $R_1$ or $R_2$ include phenyl, naphthyl or anthracyl (all either unsubstituted or substituted).

Examples of suitable heteroaryl groups for $R_1$ or $R_2$ includes pyridyl (either unsubstituted or substituted).

Any alkyl or cycloalkyl groups may be independently optionally substituted with one or more (e.g. 1, 2, 3, 4, or 5) substituents each of which may be the same or different. Suitable substituents include, but are not limited to, halide (F, Cl, Br or I) or alkoxy groups, (e.g. methoxy, ethoxy or propoxy).

Any aryl or heteroaryl groups may be independently optionally substituted with one or more (e.g. 1, 2, 3, 4, or 5) substituents each of which may be the same or different. Suitable substituents include, but are not limited to, halide (F, Cl, Br or I), straight- or branched-chain alkyl (e.g. $C_1$-$C_{10}$), alkoxy (e.g. $C_1$-$C_{10}$ alkoxy), straight- or branched-chain (dialkyl)amino (e.g. ($C_1$-$C_{10}$ dialkyl)amino), heterocycloalkyl (e.g. $C_{3-10}$ heterocycloalkyl groups, such as morpholinyl and piperadinyl) or tri(halo)methyl (e.g. $F_3C$—). Suitable substituted aryl groups include but are not limited to 2,4,6-trimethylphenyl and 2,6-dimethoxyphenyl.

Preferably, $R_1$ and $R_2$ are independently selected from the group consisting of n-propyl, iso-propyl, n-butyl, iso-butyl, sec-butyl, tert-butyl, pentyl (e.g. n-pentyl or neopentyl), hexyl, cyclopentyl, cyclohexyl or adamantyl and phenyl, wherein each group may be unsubstituted or substituted, for example with one or more substituents as hereinbefore mentioned.

More preferably, $R_1$ and $R_2$ are independently selected from the group consisting of tert-butyl, n-butyl, cyclohexyl, adamantyl 2,4,6-trimethylphenyl and 2,6-dimethoxyphenyl.

Suitably, $R_3$ is selected from the group consisting of alkyl, cycloalkyl, aryl, heteroaryl and metallocenyl.

Suitably, $R_3$ is selected from the group consisting of alkyl, cycloalkyl, aryl and metallocenyl.

In a first aspect of the invention, $R_3$ is alkyl.

The alkyl group is optionally substituted with one or more (e.g. 1, 2, 3, 4, or 5) substituents each of which may be the same or different. Suitable substituents include, but are not limited to, halide (F, Cl, Br or I), alkoxy groups, (e.g. methoxy, ethoxy or propoxy) and aryl (itself optionally substituted) (e.g. phenyl).

Examples of suitable alkyl groups for $R_3$ include methyl, ethyl, n-propyl, iso-propyl, n-butyl, iso-butyl, sec-butyl, tert-butyl, pentyl (e.g. n-pentyl or neopentyl), hexyl, heptyl, octyl, nonyl, decyl, dodecyl stearyl, wherein each group may be unsubstituted or substituted, for example with one or more substituents as hereinbefore mentioned Suitable $R_3$ alkyl groups include, t-butyl, hexyl and benzyl.

In a second aspect of the invention, $R_3$ is cycloalkyl.

Suitably, the cycloalkyl group is cyclopropyl, cyclobutyl, cyclopentyl, cyclohexyl or adamantyl.

More suitably, the cycloalkyl group is cyclohexyl or adamantyl.

In a third aspect of the invention, $R_3$ is aryl.

Suitably, the aryl group is a group of formula (II)

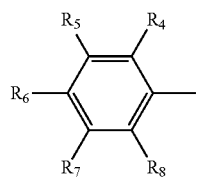

(II)

wherein:

$R_4$, $R_5$, $R_6$, $R_7$ and $R_8$ are independently hydrogen, or organic groups having 1-20 carbon atoms and are selected up to limitation imposed by stability and the rules of valence.

Suitably, $R_4$, $R_5$, $R_6$, $R_7$ and $R_8$ are independently selected from the group consisting of hydrogen, alkyl, cycloalkyl, heterocycloalkyl, alkoxy, aryl, heteroaryl, —N(alkyl)$_2$ (wherein the alkyl groups may be the same or different and are independently selected from straight-chain or branched-chain groups), —N(cycloalkyl)$_2$ (wherein the cycloalkyl groups may be the same or different), —N(aryl)$_2$ (wherein the aryl groups may be the same or different), —N(heteroaryl)$_2$ (wherein the heteroaryl groups may be the same or different) and heterocycloalkyl groups. The heteroatoms in the heteroaryl or heterocycloalkyl groups may be independently selected from sulphur, nitrogen and/or oxygen.

More suitably, $R_4$, $R_5$, $R_6$, $R_7$ and $R_8$ are independently selected from the group consisting of hydrogen, alkyl, heterocycloalkyl, alkoxy, aryl and —N(alkyl)$_2$ (wherein the alkyl groups may be the same or different and are independently selected from straight-chain or branched-chain groups).

Alkyl groups may include groups such as methyl, ethyl, n-propyl, iso-propyl, n-butyl, iso-butyl, sec-butyl, tert-butyl, pentyl (e.g. n-pentyl or neopentyl), hexyl, heptyl, octyl, nonyl, decyl, dodecyl or stearyl; suitably methyl, ethyl, n-propyl, iso-propyl, n-butyl, iso-butyl, sec-butyl, tert-butyl; more suitably, methyl, ethyl, n-propyl, iso-propyl; preferably methyl or ethyl. The alkyl groups may be optionally substituted with one or more (e.g. 1, 2, 3, 4, or 5) substituents each of which may be the same or different such as halide (F, Cl, Br or I), alkoxy groups, e.g. methoxy, ethoxy or propoxy.

Heterocycloalkyl groups may include groups such as epoxide, morpholinyl, piperadinyl, piperaxinyl, thirranyl, pyrrolidinyl, pyrazolidinyl, imazolidinyl, thiazonidinyl, thiomorpholinyl. Preferably, the heterocycloalkyl group is morpholinyl.

Alkoxy groups may include groups such as methoxy, ethoxy, n-propoxy, iso-propoxy, n-butoxy, iso-butoxy, sec-butoxy, tert-butoxy, —O-pentyl, —O-hexyl, —O-heptyl, —O-octyl, —O-nonyl, —O-decyl, —O-dodecyl. Suitably, the alkoxy group is methoxy, ethoxy, n-propoxy, iso-propoxy, n-butoxy, iso-butoxy, sec-butoxy, tert-butoxy; more suitably, methoxy, ethoxy, n-propoxy, iso-propoxy; preferably, methoxy.

Aryl groups may include groups such as phenyl, napthyl and anthracenyl; suitably phenyl. The aryl group may be optionally substituted with one or more (e.g. 1, 2, 3, 4, or 5) substituents each of which may be the same of different. Suitable substituent include, but are not limited to, alkyl, cycloalkyl, alkoxy, aryl, heteroaryl, —N(alkyl)$_2$ (wherein the alkyl groups may be the same or different and are independently selected from straight-chain or branched-chain groups), —N(cycloalkyl)$_2$ (wherein the cycloalkyl groups may be the same or different), —N(aryl)$_2$ (wherein the aryl groups may be the same or different), —N(heteroaryl)$_2$ (wherein the heteroaryl groups may be the same or different) and heterocycloalkyl groups. Suitably, the substituents are selected from alkyl or alkoxy. Suitable substituted aryl groups include, but are not limited to, 2,6-dimethoxyphenyl, 2,6-diisopropoxyphenyl and 2,4,6-triisopropylphenyl.

—N(alkyl)$_2$ groups may include groups such as —NMe$_2$, —NEt$_2$, —N(n-Pr)$_2$ or —N(i-Pr)$_2$.

In one embodiment of the third aspect of the invention, $R_4$, $R_5$, $R_6$ and $R_7$ are independently selected from the group consisting of hydrogen, alkyl, heterocycloalkyl, alkoxy, aryl and —N(alkyl)$_2$ (wherein the alkyl groups may be the same or different and are independently selected from straight-chain or branched-chain groups), suitably, hydrogen or alkoxy and $R_8$ is an aryl of formula (III)

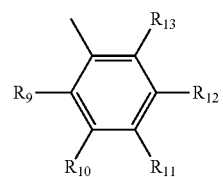

(III)

wherein $R_9$, $R_{10}$, $R_{11}$, $R_{12}$ and $R_{13}$ are independently selected from the group consisting of hydrogen, alkyl, cycloalkyl, alkoxy, aryl, heteroaryl, —N(alkyl)$_2$ (wherein the alkyl groups may be the same or different and are independently selected from straight-chain or branched-chain groups), —N(cycloalkyl)$_2$ (wherein the cycloalkyl groups may be the same or different), —N(aryl)$_2$ (wherein the aryl groups may be the same or different), —N(heteroaryl)$_2$ (wherein the heteroaryl groups may be the same or different) and heterocycloalkyl groups. The heteroatoms in the heteroaryl or heterocycloalkyl groups may be independently selected from sulphur, nitrogen or/and oxygen. Suitably, $R_9$, $R_{10}$, $R_{11}$, $R_{12}$ and $R_{13}$ are independently selected from the group consisting of hydrogen, alkyl and alkoxy.

In an alternative embodiment of the third aspect of the invention, $R_4$, $R_5$, $R_6$ and $R_7$ may be independently selected from the group consisting of hydrogen, alkyl, heterocycloalkyl, alkoxy, aryl and —N(alkyl)$_2$ (wherein the alkyl groups may be the same or different and are independently selected from straight-chain or branched-chain groups), suitably, hydrogen or alkoxy and $R_8$ is an unsubstituted heterocycloalkyl group, such as a $C_{4-8}$ heterocycloalkyl groups, such as piperidinyl and morpholinyl, preferably morpholinyl.

In a yet further embodiment of the third aspect of the invention, $R_4$, $R_5$, $R_6$ and $R_7$ may be independently selected from the group consisting of hydrogen, alkyl, heterocycloalkyl, alkoxy, aryl and —N(alkyl)$_2$ (wherein the alkyl groups may be the same or different and are independently selected from straight-chain or branched-chain groups), suitably, hydrogen or alkoxy and $R_8$ is hydrogen.

In a fourth aspect of the invention, $R_3$ is heteroaryl. The heteroaryl group may be optionally substituted with one or more (e.g. 1, 2, 3, 4 or 5) substituents such as halide, straight- or branched-chain alkyl, alkoxy, substituted or unsubstituted aryl, straight- or branched-chain (dialkyl) amino, heterocycloalkyl or tri(halo)alkyl.

In a fifth aspect of the invention, $R_3$ is metallocenyl. Suitably, the metallocenyl group is ferrocenyl, preferably where the cyclopentadienyl rings are substituted.

Suitably, $PR_1R_2R_3$ is selected from the group consisting of:

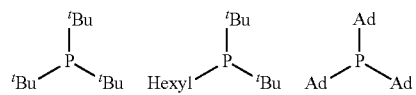

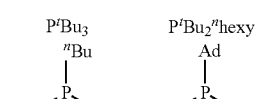

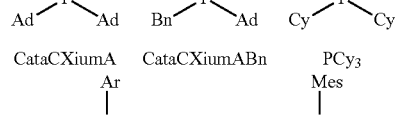

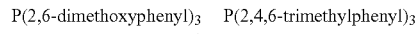

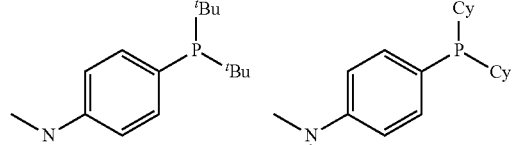
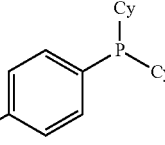

-continued

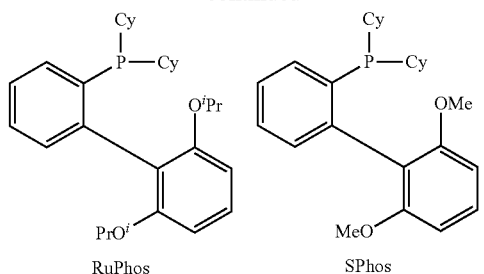

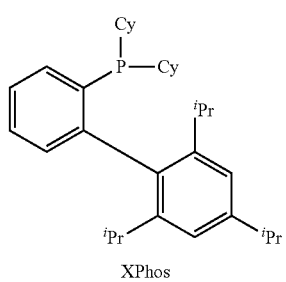

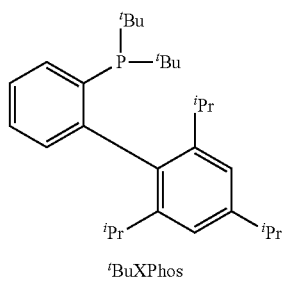

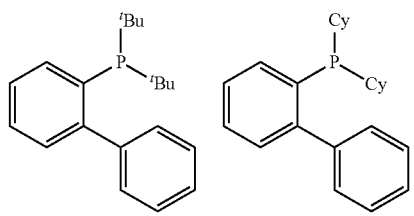

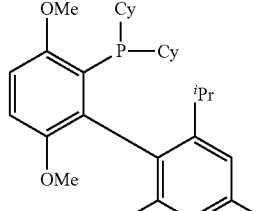

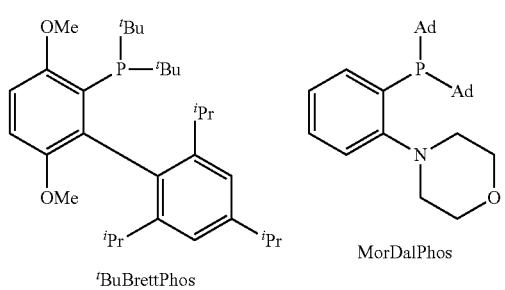

-continued

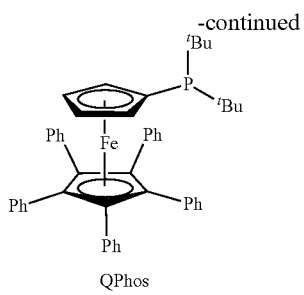

QPhos

Ad=adamantyl
Cy=cyclohexyl
Bn=benzyl
Ar=2,6 dimethoxyphenyl
Mes=2,4,6-trimethylphenyl The compounds of formula (I) are readily synthesised in a single step from $H_2PdCl_4$ in high yield. When X (in the compound for formula (I)) is Cl, the process comprises the step of reacting a compound of formula $H_2PdCl_4$ with ligand $PR_1R_2R_3$. When X (in the compound of formula (I)) is other than Cl (i.e. when X is Br, F or I), the process comprises the step of reacting a compound of formula $H_2PdCl_4$ with ligand $PR_1R_2R_3$ and a compound ZX' (where Z is hydrogen or a monovalent metal ion, (such as Li or K) and X' is Br, F or I).

Thus, a further aspect of the invention provides a process for the preparation of a compound of formula (IA)

$$[M_2Cl_6][HPR_1R_2R_3]_2 \quad (IA)$$

wherein M, $R_1$, $R_2$ and $R_3$ are as hereinbefore defined, said process comprising the step of reacting a compound of formula $H_2PdCl_4$ with ligand $PR_1R_2R_3$ or a salt thereof. Suitable salts include but are not limited to, the chloride and tetrafluoroborate.

Another aspect of the invention provides a process for the preparation of a compound of formula (IB)

$$[M_2X'_6][HPR_1R_2R_3]_2 \quad (IB)$$

wherein M, $R_1$, $R_2$ and $R_3$ are as hereinbefore defined and X' is bromide, iodide or fluoride (suitably bromide), said process comprising the step of reacting a compound of formula $H_2PdCl_4$ with ligand $PR_1R_2R_3$ or a salt thereof and a compound ZX' wherein Z is hydrogen or a monovalent metal ion, such as Li or K. Suitable salts include but are not limited to, the chloride and tetrafluoroborate.

Compound $H_2PdCl_4$ and ligands $PR_1R_2R_3$ are commercially available from Johnson Matthey PLC, or any other commercial supplier, such as Aldrich, Dalchem, TCI Chemicals Compound ZX' is commercially available, for example from Aldrich, Alfa Aesar etc.

The compound of formula $H_2PdCl_4$, ligand $PR_1R_2R_3$ and, where used, compound ZX' are combined in a solvent. In this case, the solvent is any suitable aprotic solvent or combination of aprotic solvents. Examples of aprotic solvents are toluene, benzene, tetrahydrofuran (THF), 2-methyltetrahydrofuran, dichloromethane (DCM), dioxane, acetone, acetonitrile, dimethylformamide (DMF), N-methylpyrrolidine (NMP), dimethylacetamide (DMAc), methyl-tertbutylether (MTBE), diethylether, eucalyptol, hexane, heptane, pentane or ethylacetate. Alternatively, a protic solvent, such as ethanol, methanol or water, can be used or a combination of protic/aprotic solvent. The choice of solvent system is within the capability and knowledge of the skilled person knowing the starting materials which will be used.

In one embodiment, the solvent is acetone.

The concentration of the compound of formula $H_2PdCl_4$ in the solvent is suitably about 0.001 mol/L to about 3.00 mol/L, more suitably about 0.03 mol/L to about 2.50 mol/L, preferably about 0.1 mol/L to about 1.0 mol/L.

Any suitable quantity of ligand $PR_1R_2R_3$ may be used, although it is preferred that the molar ratio of the compound of formula $H_2PdCl_4$ to ligand $PR_1R_2R_3$ is from about 15:1 to about 1:15, suitably from about 10:1 to about 1:10, preferably from about 5:1 to about 1:5. In one embodiment the molar ratio of the compound of formula $H_2PdCl_4$ to ligand $PR_1R_2R_3$ is from about 1.5:1 to about 1:1.5. If the ligand is insoluble in the solvent, an excess of the Pd salt is preferred.

When ZX' is added to the reaction mixture, suitably it is added in an excess compared to the compound of formula $H_2PdCl_4$ and ligand $PR_1R_2R_3$, such as at least 5 mole equivalents, suitably at least 8 mole equivalents.

The reaction is suitably carried out under an inert atmosphere, such as under nitrogen or argon; preferably, the reaction is carried out under nitrogen. Alternatively, if the ligand is stable, the reaction may be carried out in air.

The process of the invention may be carried out at a temperature in the range of −10° C. to about 100° C., suitably about 0° C. to about 60° C., preferably about 0° C. to about 35° C. and more preferably at ambient temperature (i.e. about 15° C. to about 30° C., such as about 18° C. to about 27° C.). It is preferred that the temperature is maintained below the decomposition temperature and so when the compound for formula (I) is known to decompose with the temperature ranges given above, the temperature should be maintained below the decomposition temperature.

The reaction may be carried out for a period of from about 30 minutes to about 24 hours. Usually, the reaction is complete within about 6 hours, such as within 4 hours, such as within 1 hour. Often the reaction is essentially instantaneous. After the reaction is complete, the resulting suspension is filtered, washed and dried. Drying may be performed using known methods, for example at temperatures in the range of about 10° C. to about 60° C., preferably about 20° C. to about 40° C. under 1-30 mbar vacuum for 1 hour to 5 days. If desired, the compound may be recrystallised. An antisolvent may be used when the compound is soluble.

The compounds of the invention may be used for carbon-carbon coupling reactions. Examples of carbon-carbon coupling reactions include Heck, Suzuki or Negishi reactions, ketone α-arylation reactions, aldehyde α-arylations reactions, allylic substitution reactions and trifluoromethylation reactions. The catalysts of the present invention may also be used for carbon-heteroatom coupling reactions, such as carbon-nitrogen coupling reactions (ie Buchwald-Hartwig) or carbon-oxygen or carbon-sulphur coupling reactions.

Thus, in a further aspect the present invention provides a process for carrying out a carbon-carbon coupling reaction in the presence of a catalyst, the process comprising the use of a compound of formula (I) as hereinbefore defined. Alternatively, the present invention provides the use of a compound of formula (I) as hereinbefore define to catalyse a carbon-carbon coupling reaction.

In a still further aspect, the present invention provides a process for carrying out a carbon-heteroatom coupling reaction, the process comprising the use of a compound of formula (I) as hereinbefore defined. Alternatively, the present invention provides the use of a compound of formula (I) as hereinbefore defined to catalyse a carbon-heteroatom coupling reaction.

The invention will now be further described by way of the following non-limiting examples.

Example 1

All solvents and reagents were purchased from commercial sources and used as received. All catalysts, ligands or precious metal precursors were obtained from Johnson Matthey PLC or commercial sources. All solution phase $^1$H NMR, $^{13}$C NMR, $^{31}$P NMR and $^{19}$F NMR spectra were recorded on a Bruker Avance DRX-400 spectrometer at ambient temperature; chemical shifts (δ) are given in ppm. $^1$H and $^{13}$C NMR spectra were referenced to the NMR solvent peaks or internal TMS. $^{31}$P NMR spectra were calibrated to an external phosphoric acid standard (85% in $D_2O$ as provided by Sigma Aldrich). Coupling constants (J) are reported in Hz and apparent splitting patterns are designated using the following abbreviations: s (singlet), d (doublet), t (triplet), q (quartet), m (multiplet), br (broad), app. (apparent) and the appropriate combinations. Solid state $^{31}$P NMR were acquired at a static magnetic field strength of 14.1 T ($v_0$ ($^1$H)=600 MHz) on a Bruker Avance Neo console. The probe was tuned to 242:98 MHz and referenced to ADP at 0:9 ppm. Powdered samples of known mass were packed into zirconia MAS rotors with Kel-F caps. The rotors were spun using ambient temperature purified compressed air. All spectra were recorded using cross polarisation (CP), in which magnetisation is transferred from $^1$H to $^{31}$P nuclei via dipolar coupling. A contact time of 2 ms was used for the $^{31}$P experiments and high power (100 kHz) SPINAL-64 decoupling was applied to the $^1$H channel during acquisition.

Crystals of sufficient size and quality for analysis by single crystal Xray diffraction were isolated, and data were collected using a Rigaku Oxford Diffraction Supernova Dual Source (four-circle-diffractometer equipped with Oxford Cryosystems Cobra cooling device). The data were collected using Cu Kα radiation as stated in the experimental tables. Structures were solved and refined against F$^2$ values using the Bruker AXS SHELXTL suite or the OLEX$^2$ crystallographic software. All non-hydrogen atoms were refined anisotropically. Hydrogen atoms attached to carbon were placed geometrically and allowed to refine with a riding isotropic displacement parameter. Hydrogen atoms attached to a phosphorus were located in a difference Fourier synthesis and were allowed to refine freely with an isotropic displacement parameter.

All GC were recorded on a Varian CP-3800 Gas Chromatograph with an Agilent DB-1, 20 m×0.18 mm column and CP-8400 Autosampler. All samples were run with a standard split injection mode using either He or $N_2$ carrier gas. Samples were run using ethyl acetate or acetonitrile eluent. Conversion was determined by comparative integration of appropriate reagents, products and impurities. Preferably conversion is determined from the ratio of product to aryl halide.

General Procedure A to Synthesize $[HL]_2[Pd_2Cl_6]$ Dimers:

A 100 mL round bottomed flask equipped with a stir bar and condenser was charged with the ligand or a salt thereof and acetone. The flask was purged with nitrogen then a solution of $H_2PdCl_4$ in acetone was added rapidly. The mixture was stirred for a minimum of 0.5 h at ambient temperature (18-27° C.). The resulting suspension was filtered then washed with acetone then heptane under air. The catalyst was dried in vacuo at ambient temperature. For reactions producing >40 g catalyst, the round bottomed flask and stir bar was replaced with either a 600 mL beaker or jacketed reactor with overhead stirrer.

General Procedure B to Synthesize $[HL]_2[Pd_2Br_6]$ Dimers:

A 100 mL round bottomed flask equipped with a stir bar and condenser was charged with the ligand or a salt thereof and acetone. The flask was purged with nitrogen then a solution of $H_2PdCl_4$ in acetone was added rapidly. The mixture was stirred for a minimum of 0.5 h at ambient temperature (18-27° C.) then a solution of MBr (M=H, Li, K) in deionized water was added dropwise. The resulting suspension was stirred for a minimum of 90 mins then filtered. The solids were washed with acetone then heptane under air. The catalyst was dried in vacuo at ambient temperature. For reactions producing >40 g catalyst, the round bottomed flask and stir bar was replaced with either a 600 mL beaker or jacketed reactor with overhead stirrer.

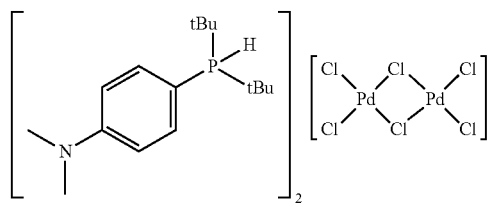

$[HAmPhos]_2[Pd_2Cl_6]$: Following general procedure A, $H_2PdCl_4$ solution (12.0 g Pd, 0.113 mol) and AmPhos (30.0 g, 0.113 mol) are reacted in acetone (140 mL) at rt for 60 min. The resulting suspension is filtered, washed and dried to afford $[HAmPhos]_2[Pd_2Cl_6]$ (51.4 g, 95%) as beige solids. $^{31}$P solid-state CPMAS NMR spectra: δ (ppm) 66.4. Anal. Calc for $C_{32}H_{58}N_2P_2Cl_6Pd_2$: C 40.11; H 6.10; N 2.92. Found: C 39.86; H 6.12; N 2.83. Pd Assay w/w % Calc: 22.21. Found 21.36.

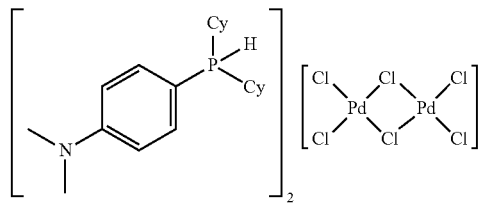

$[HCyAmPhos]_2[Pd_2Cl_6]$: Following general procedure A, $H_2PdCl_4$ solution (0.402 g Pd, 3.78 mmol) and CyAmPhos (1.19 g, 3.74 mmol) are reacted in acetone (15 mL) at rt for 60 min. The resulting suspension is filtered, washed and dried to afford $[HCyAmPhos]_2[Pd_2Cl_6]$ (1.63 g, 83%) as beige solids. $^1$H NMR (CDCl$_3$): δ (ppm) 7.83 (m, 2H), 7.69 (m, 2H), 3.21 (s, 6H), 2.55 (m, 2H), 2.2-1.0 (m, 20H). $^{31}$P{$^1$H}=30.2 ppm in CDCl$_3$.

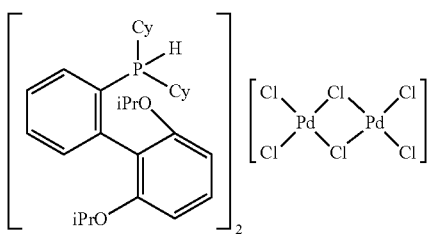

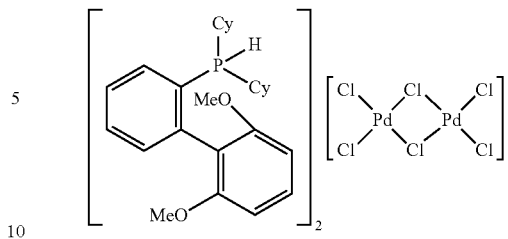

[H RuPhos]$_2$[Pd$_2$Cl$_6$]: Following general procedure A, H$_2$PdCl$_4$ solution (7.89 g Pd, 74.1 mmol) and RuPhos (34.5 g, 73.9 mmol) are reacted in acetone (150 mL) at rt for 70 min. The resulting suspension is filtered, washed and dried to afford [HRuPhos]$_2$[Pd$_2$Cl$_6$] (45.9 g, 91%) as red solids. $^1$H NMR (CDCl$_3$): δ (ppm) 8.51 (dd, J=12.0, 7.8 Hz, 1H), 7.92 (td, J=7.7, 1.3 Hz, 1H), 7.72 (t, J=7.6 Hz, 1H), 7.47 (t, J=8.4 Hz, 1H), 7.31 (dd, J=7.4, 1.2 Hz, 1H), 6.77 (s, J=8.4 Hz, 2H), 6.02 (dt, $^1J_{HP}$=468 Hz, $^3J_{HH}$=6.7 Hz, 1H), 4.53 (hept, J=6.1 Hz, 2H), 3.28 (m, 2H), 2.15 (m, 4H), 1.9-1.6 (m, 10H), 1.6-1.4 (m, 4H), 1.3-1.2 (m, 2H), 1.24 (d, J=Hz, 6.1 Hz, 6H) 1.08 (d, J=6.0 Hz, 6H). $^{13}$C{$^1$H} NMR (CDCl$_3$): δ (ppm) 156.0, 141.8, 141.7, 134.3, 134.2, 133.6, 133.6, 133.0, 132.9, 131.4, 129.2, 129.1, 118.5, 118.5, 114.6, 113.8, 107.8, 72.0, 29.6, 29.2, 28.3, 28.3, 27.4, 27.4, 25.9, 25.8, 25.7, 25.6, 25.2, 25.2, 22.6, 21.9. $^{31}$P NMR (CDCl$_3$): δ (ppm) 22.2 (d, $^1J_{HP}$=469 Hz). Anal. Calc for C$_{60}$H$_{88}$O$_4$P$_2$Cl$_6$Pd$_2$: C 52.96; H 6.62; N 0.00. Found: C 52.91; H 6.57; N 0.00. Pd Assay w/w % Calc: 15.64. Found 15.56.

[HSPhos]$_2$[Pd$_2$Cl$_6$]: Following general procedure A, H$_2$PdCl$_4$ solution (9.07 g Pd, 85.3 mmol) and SPhos (35.0 g, 85.2 mmol) are reacted in acetone (100 mL) at rt for 70 min. The resulting suspension is filtered, washed and dried to afford [HSPhos]$_2$[Pd$_2$Cl$_6$] (49.6 g, 93%) as orange solids. $^1$H NMR (CDCl$_3$): δ (ppm) 8.14 (m, 1H), 7.76 (m, 2H), 7.69 (t, J=8.5 Hz, 1H), 7.43 (m, 1H), 6.92 (d, J=8.2 Hz, 2H), 6.63 (d, $^1J_{HP}$=490 Hz, 1H), 3.81 (s, 6H), 3.1 (m, 2H), 2.2-1.2 (m, 20H). $^{13}$C{$^1$H} NMR (CDCl$_3$): δ (ppm) 156.8, 141.8, 141.7, 134.0, 134.0, 133.7, 133.6, 133.5, 133.4, 132.5, 128.6, 128.4, 114.5, 114.5, 105.0, 55.8, 30.9, 29.9, 29.5, 27.7, 27.7, 26.8, 26.7, 26.2, 26.0, 26.0, 25.9, 25.2. $^{31}$P NMR (CDCl$_3$): δ (ppm) 18.0 (d, $^1J_{HP}$=490 Hz). Anal. Calc for C$_{58}$H$_{72}$O$_4$P$_2$Cl$_6$Pd$_2$: C 50.02; H 5.81; N 0.00. Found: C 50.30; H 5.86; N 0.00. Pd Assay w/w % Calc: 17.05. Found 16.59.

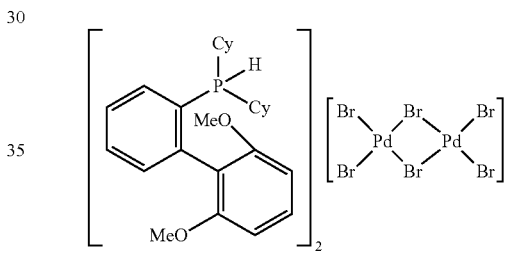

[HSPhos]$_2$[Pd$_2$Br$_6$]: Following general procedure B, H$_2$PdCl$_4$ solution (0.527 g Pd, 4.96 mmol) and SPhos (2.03 g, 4.95 mmol) are reacted in acetone (15.0 g) at rt for 30 min. To the suspension was added a solution of LiBr (1.76 g, 20.3 mmol) in deionized water (5.0 g) The resulting suspension is filtered, washed and dried to afford [HSPhos]$_2$[Pd$_2$Br$_6$] (3.62 g, 96%) as red solids. $^1$H NMR (CDCl$_3$): δ (ppm) 8.11 (m, 1H), 7.77 (m, 2H), 7.70 (t, J=8.4 Hz, 1H), 7.44 (m, 1H), 6.93 (d, J=8.5 Hz, 2H), 6.54 (dt, $^1J_{HP}$=484 Hz, $^3J_{HH}$=6.4 Hz, 1H), 3.81 (s, 6H), 3.13 (m, 2H), 2.2-2.0 (m, 4H), 2.0-1.2 (m, 16H). $^{31}$P NMR (CDCl$_3$): δ (ppm) 17.9 (d, $^1J_{HP}$=484 Hz).

[HSPhos]2[Pd$_2$Br$_6$] was recrystallised from acetone to obtain red block crystals. The asymmetric unit contains one molecule of HSPhos, half of the Pd$_2$Br$_6$ moiety and one molecule of acetone. Empirical formula: C$_{58}$H$_{84}$Br$_6$O$_6$P$_2$Pd$_2$; Formula weight: 1631.45; Temperature: 100 K; Wavelength: 1.54178 Å; Crystal size: 0.200× 0.200×0.070 mm; Crystal habit: dark red cut block; Crystal system: Triclinic; Space group: P-1; Unit cell dimensions: a=8.4964(3) Å, b=11.2493(4) Å, c=16.6037(4) Å, α=88.969 (2)°, β=78.219(2)°, γ=80.045(3)°; Volume: 1529.90(8) Å$^3$; Z=1; Density (calculated): 1.771 Mg/m$^3$; Absorption coefficient μ: 10.200 mm-1; F(000): 812; Theta range for data collection: 3.990 to 70.283°; Index ranges: −10≤h≤9, −13≤k≤13, −20≤l≤12; Reflections collected: 29205; Independent reflections: 5809 [R(int)=0.0350]; Coverage of independent reflections: 100.0%; Data/restraints/param-

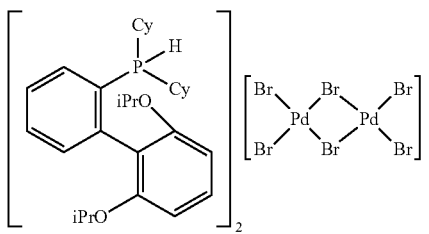

[HRuPhos]$_2$[Pd$_2$Br$_6$]: Following general procedure B, H$_2$PdCl$_4$ solution (0.524 g Pd, 4.92 mmol) and RuPhos (2.26 g, 4.84 mmol) are reacted in acetone (15.0 g) at rt for 30 min. To the suspension was added a solution of LiBr (1.80 g, 20.8 mmol) in deionized water (5.0 g) The resulting suspension is filtered, washed and dried to afford [HRuPhos]$_2$[Pd$_2$Br$_6$] (3.9 g, 97%) as red solids. $^1$H NMR (CDCl$_3$): δ (ppm) 8.47 (dd, J=12.0, 7.8 Hz, 1H), 7.93 (m, 1H), 7.73 (t, J=7.7 Hz, 1H), 7.46 (t, J=8.4 Hz, 1H), 7.32 (dd, J=7.8, 4.4 Hz, 1H), 6.75 (d, J=7.9 Hz, 2H), 6.13 (dt, $^1J_{HP}$=470 Hz, $^3J_{HH}$=6.7 Hz, 1H), 4.53 (hept, J=6.1 Hz, 2H), 4.39 (m, 2H), 3.30 (m, 2H), 2.18 (m, 4H), 2.0-1.3 (m, 14H), 1.26 (d, J=6.1 Hz, 6H), 1.08 (d, J=5.9 Hz, 6H). $^{31}$P NMR (CDCl$_3$): δ (ppm) 21.7 (d, $^1J_{HP}$=470 Hz).

eters: 5809/0/342; Goodness-of-fit on F2: 1.068; Δ/σmax: 0.001; Final R indices: 5297 data; I>2σ(I)R1=0.0241, wR2=0.0574; all data: R1=0.0276, wR2=0.0598; Δρ: 0.471 and −0.855 eÅ$^{-3}$.

A view of [HSPhos]$_2$[Pd$_2$Br$_6$] from the crystal structure (grown fragment) is shown in FIG. 1. Anisotropic atomic displacement ellipsoids for the non-hydrogen atoms are shown at the 50% probability level. Hydrogen atoms are displayed with an arbitrarily small radius.

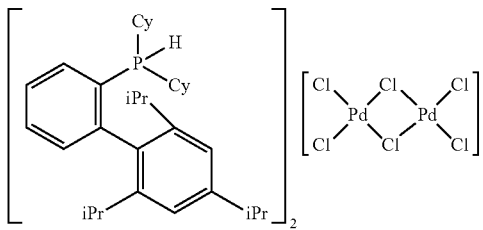

[HXPhos]$_2$[Pd$_2$Cl$_6$]: A 250 mL round bottomed flask equipped with a stir bar and condenser was charged with XPhos (10.3 g, 21.6 mmol) and acetone (55 mL). The flask was purged with nitrogen then 37% w/w HCl (2.40 g, 65.9 mmol) was added dropwise until the XPhos fully dissolved. To the round bottomed flask, a solution of H$_2$PdCl$_4$ (2.33 g, 21.9 mmol) in acetone (15 mL) was added rapidly. The mixture was stirred for 60 min at ambient temperature. The resulting suspension is filtered, washed and dried to afford [HXPhos]$_2$[Pd$_2$Cl$_6$] (2.37 g, 91%) as peach solids. $^1$H NMR (CDCl$_3$): δ (ppm) 9.12 (dd, J=12.4, 7.8 Hz, 1H), 8.19 (m, 1H), 7.79 (m, 1H), 7.45 (dd, J=7.7, 4.8 Hz, 1H), 7.45 (s, 2H), 5.71 (d, $^1J_{HP}$=454 Hz, 1H), 3.35 (m, 2H), 2.99 (hept, J=6.9 Hz, 1H), 2.4-2.2 (m, 4H), 2.1-1.9 (m, 4H), 1.9-1.6 (m, 12H), 1.5-1.2 (m, 14H), 1.04 (d, J=6.6 Hz, 6H). $^{13}$C{$^1$H} NMR (CDCl$_3$): δ (ppm) 150.9, 146.6, 145.0, 144.9, 136.6, 136.5, 134.1, 134.0, 132.7, 132.6, 132.0, 132.0, 130.6, 130.4, 121.5, 114.2, 113.4, 34.3, 30.9, 30.7, 30.5, 28.7, 28.7, 28.6, 28.6, 26.4, 26.0, 25.9, 25.9, 25.8, 25.1, 24.0, 22.5. $^{31}$P NMR (CDCl$_3$): δ (ppm) 20.4 (d, $^1J_{HP}$=452 Hz). Anal. Calc for C$_{66}$H$_{100}$P$_2$Cl$_6$Pd$_2$: C 57.40; H 7.30; N 0.00. Found: C 57.68; H 7.51; N 0.00.

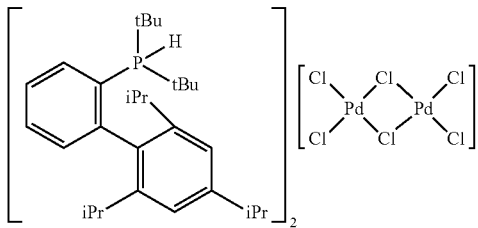

[HtBuXPhos]$_2$[Pd$_2$Cl$_6$]: Following general procedure A, H$_2$PdCl$_4$ solution (8.31 g Pd, 78.5 mmol) and tBuXPhos (33.3 g, 78.3 mmol) are reacted in acetone (100 mL) at rt for 60 min. The resulting suspension is filtered, washed and dried to afford [HtBuXPhos]2[Pd$_2$Cl$_6$] (37.3 g, 75%) as orange solids. Reaction supernatant and acetone washings were combined and concentrated to furnish orange crystals. (7.61 g, 15%). $^1$H NMR (CDCl$_3$): δ (ppm) 8.51 (dd, J=11.0, 8.0 Hz, 1H), 8.30 (t, J=7.0 Hz, 1H), 7.86 (t, J=7.6 Hz, 1H), 7.54 (dd, J=6.9, 4.9 Hz, 1H), 7.13 (s, 2H), 5.58 (d, $^1J_{HP}$=446 Hz, 1H), 2.98 (hept, J=6.9 Hz, 1H), 2.37 (hept, J=6.7 Hz, 2H), 1.77 (s, 9H), 1.73 (s, 9H), 1.32 (d, J=6.9 Hz, 6H), 1.26 (d, J=6.9 Hz, 6H), 1.02 (d, J=6.5 Hz, 6H). $^{13}$C{$^1$H} NMR (CDCl$_3$): δ (ppm) 150.9, 146.7, 145.8, 145.7, 135.1, 135.0, 134.2, 134.2, 133.9, 133.8, 131.4, 131.3, 130.5, 130.4, 121.6, 115.0, 114.3, 35.9, 35.6, 34.1, 31.0, 29.2, 26.8, 23.9, 22.2. $^{31}$P NMR (CDCl$_3$): δ (ppm) 32.5 (d, $^1J_{HP}$=463 Hz). Anal. Calc for C$_{58}$H$_{92}$P$_2$Cl$_6$Pd$_2$: C 54.56; H 7.26; N 0.00. Found: C 54.14; H 7.22; N 0.00. Pd Assay w/w % Calc: 16.67. Found 16.47.

Asymmetric unit contains two independent molecules of HtBuXPhos and one Pd$_2$Cl$_6$ moiety. Empirical formula: C$_{29}$H$_{46}$Cl$_3$PPd; Formula weight: 638.38; Temperature: 100 (2) K; Wavelength: 1.54178 Å; Crystal size: 0.180×0.150× 0.070 mm; Crystal habit: dark orange fragment; Crystal system: Triclinic; Space group: P-1; Unit cell dimensions: a=8.5276(2) Å b=9.6987(2) Å c=38.5644(6) Å α=92.1220 (10)° β=94.6160(10)°γ=104.303(2)°; Volume: 3075.29(11) Å$^3$; Z=4; Density (calculated): 1.379 Mg/m$^3$; Absorption coefficient μ: 7.861 mm-1; F(000): 1328; Theta range for data collection: 3.455 to 70.231°; Index ranges: −10≤h≤10, −11≤k≤11, −39≤l≤47; Reflections collected: 60094; Independent reflections: 11681 [R(int)=0.0433]; Coverage of independent reflections: 100.0%; Data/restraints/parameters: 11681/0/645; Goodness-of-fit on F$^2$: 1.066; Δ/σ$_{max}$: 0.009; Final R indices: 9941 data; I>2σ(I)R1=0.0296, wR2=0.0687; all data: R1=0.0387, wR2=0.0742; Δρ: 0.657 and −0.492 eÅ$^{-3}$.

Figure 2:
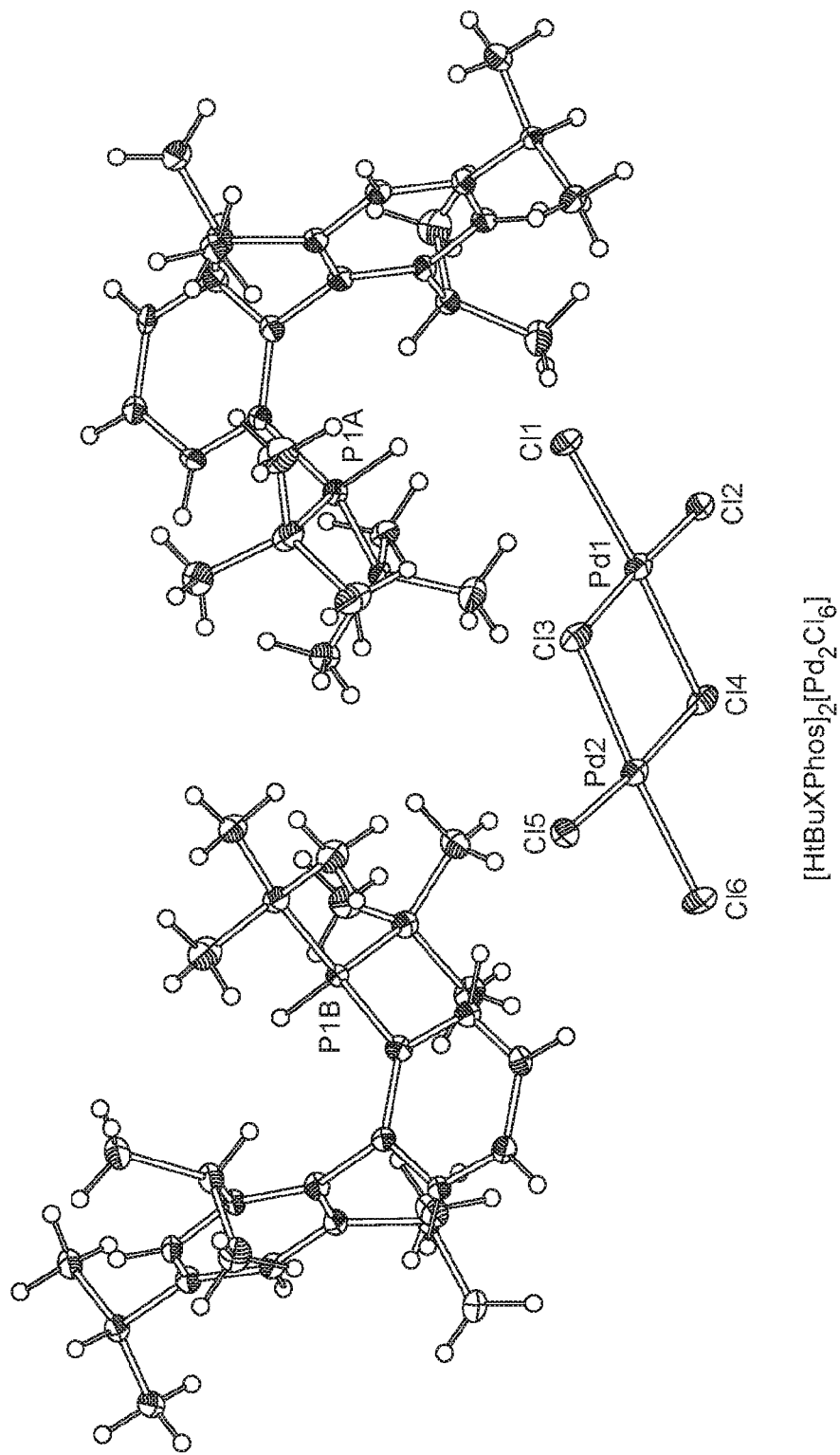
FIG. 2 shows the crystal structure of $[HtBuXPhos]_2$ $[Pd_2Cl_6]$.

A view of [HtBuXPhos]$_2$[Pd$_2$Cl$_6$] from the crystal structure is shown in FIG. 2. Anisotropic atomic displacement ellipsoids for the non-hydrogen atoms are shown at the 50% probability level. Hydrogen atoms are displayed with an arbitrarily small radius

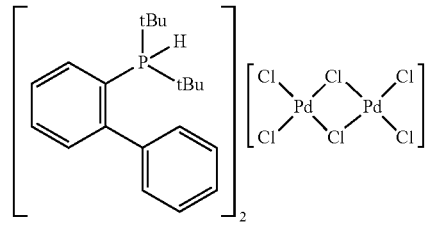

[HJohnPhos]$_2$[Pd$_2$Cl$_6$]: Following general procedure A, H$_2$PdCl$_4$ solution (0.404 g Pd, 3.79 mmol) and JohnPhos (1.12 g, 3.76 mmol) are reacted in acetone (15 mL) at rt for 40 min. The resulting suspension is filtered, washed and dried to afford [HJohnPhos]$_2$[Pd$_2$Cl$_6$] (1.68 g, 87%) as orange-brown solids. $^1$H NMR (CD$_3$CN): δ (ppm) 8.00 (m, 1H), 7.92 (tt, J=7.7, 1.3 Hz, 1H), 7.81 (m, 1H), 7.62 (m, 1H), 7.59 (m, 3H), 7.32 (m, 2H), 6.07 (d, $^1J_{HP}$=470 Hz, 1H), 1.47 (s, 9H), 1.43 (s, 9H). $^{13}$C{$^1$H} NMR (CD$_3$CN): δ (ppm) 149.4, 149.3, 139.1, 139.0, 135.1, 135.0, 133.4, 133.3, 133.1, 133.1, 130.1, 129.7, 129.5, 129.5, 129.4, 114.8, 114.1, 35.6, 35.3, 27.8. $^{31}$P NMR (CD$_3$CN): δ (ppm) 29.8 (m, $^1J_{HP}$=470 Hz). Anal. Calc for C$_{46}$H$_{56}$P$_2$Cl$_6$Pd$_2$: C 46.90; H 5.51; N 0.00. Found: C 46.89; H 5.50; N 0.00.

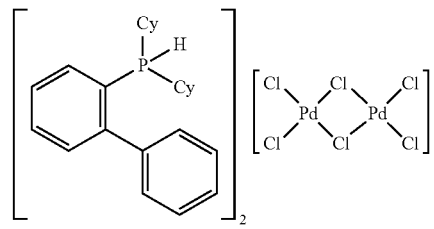

[HCyJohnPhos]$_2$[Pd$_2$Cl$_6$]: Following general procedure A, H$_2$PdCl$_4$ solution (0.401 g Pd, 3.77 mmol) and CyJohnPhos (1.31 g, 3.75 mmol) are reacted in acetone (15 mL) at rt for 90 min. The resulting suspension is filtered, washed and dried to afford [HCyJohnPhos]$_2$[Pd$_2$Cl$_6$] (1.77 g, 83%) as orange-brown solids. $^1$H NMR (CDCl$_3$): δ (ppm) 8.58 (dd, J=12.8, 7.8 Hz, 1H), 7.95 (t, J=7.4 Hz, 1H), 7.80 (t, J=7.6 Hz, 1H), 7.63 (m, 3H), 7.53 (dd, J=7.2, 4.6 Hz, 1H), 7.29 (m, 2H), 6.85 (dt, $^1J_{HP}$=473 Hz, $^3J_{HH}$=12.3 Hz, 1H), 3.05 (m, 2H), 2.00 (s, 2H), 1.86 (m, 4H), 1.8-1.4 (m, 12H), 1.33 (m, 2H). $^{13}$C{$^1$H} NMR (CDCl$_3$): δ (ppm) 207.0, 148.0, 148.0, 138.6, 138.6, 135.7, 135.6, 134.4, 134.4, 131.8, 131.7, 130.0, 129.9, 129.6, 129.5, 129.2, 112.9, 112.1, 30.9, 30.7, 30.3, 28.6, 28.5, 27.5, 27.5, 26.0, 25.8, 25.1, 25.1. $^{31}$P NMR (CDCl$_3$): δ (ppm) 20.5 (d, $^1J_{HP}$=474 Hz). Anal. Calc for C$_{48}$H$_{64}$P$_2$Cl$_6$Pd$_2$: C 51.09; H 5.72; N 0.00. Found: C 51.52; H 6.00; N 0.00.

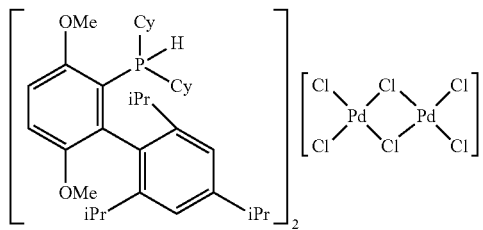

[HBrettPhos]$_2$[Pd$_2$Cl$_6$]: Following general procedure A, H$_2$PdCl$_4$ solution (7.94 g Pd, 74.6 mmol) and BrettPhos (40.0 g, 74.5 mmol) are reacted in acetone (180 mL) at rt for 70 min. The resulting suspension is filtered, washed and dried to afford [HBrettPhos]$_2$[Pd$_2$Cl$_6$] (45.2 g, 81%) as orange solids. $^1$H NMR (CDCl$_3$): δ (ppm) 7.78 (m, 2H), 7.10 (s, 2H), 4.96 (dt $^1J_{HP}$=444 Hz, $^3J_{HH}$=6.2 Hz, 1H), 4.42 (s, 3H), 3.77 (s, 3H), 2.98 (hept, J=7.0 Hz, 2H), 2.37 (hept J=6.6 Hz, 1H), 2.22 (m, 2H), 1.95 (m, 2H), 1.9-1.5 (m, 10H), 1.59 (m, 2H), 1.4-1.1 (m, 18H), 1.02 (d, J=6.4 Hz, 6H). $^{13}$C{$^1$H} NMR (CDCl$_3$): δ (ppm) 155.5, 155.4, 153.2, 153.1, 150.4, 146.8, 134.8, 134.7, 128.0, 128.0, 121.3, 119.9, 112.9, 112.8, 104.6, 103.8, 58.4, 55.6, 34.1, 31.8, 31.4, 30.8, 30.0, 30.0, 28.4, 28.4, 26.3, 26.2, 26.2, 26.0, 25.4, 25.1, 25.0, 23.9, 23.3. $^{31}$P NMR (CDCl$_3$): δ (ppm) 23.0.0 (d, $^1J_{HP}$=445 Hz). Anal. Calc for C$_{70}$H$_{108}$O$_4$P$_2$Cl$_6$Pd$_2$: C 56.01; H 7.25; N 0.00. Found: C 55.83; H 7.24; N 0.00. Pd Assay w/w % Calc: 14.18. Found 14.06.

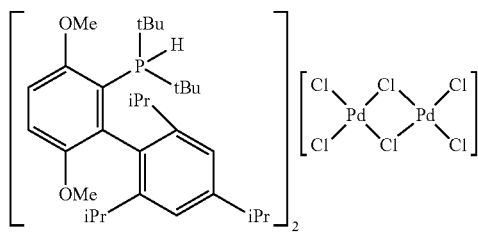

[HtBuBrettPhos]$_2$[Pd$_2$Cl$_6$]: Following general procedure A, H$_2$PdCl$_4$ solution (7.63 g Pd, 71.8 mmol) and tBuBrettPhos (34.8 g, 71.8 mmol) are reacted in acetone (100 mL) at rt for 55 min. The resulting suspension is filtered, washed and dried to afford [HtBuBrettPhos]$_2$[Pd$_2$Cl$_6$] (46.7 g, 93%) as red solids. Reaction supernatant and acetone washings were combined and layered with deionized water to furnish red crystals (2.3 g, 4%). $^1$H NMR (CDCl$_3$): δ (ppm) 8.05 (m, 1H), 7.95 (m, 1H), 7.06 (s, 2H), 5.11 (d, $^1J_{HP}$=435 Hz, 1H), 4.35 (m, 3H), 3.76 (s, 3H), 2.94 (m, 1H), 2.37 (m, 2H), 1.54 (s, 9H), 1.50 (s, 9H), 1.29 (m, 6H), 1.22 (m, 6H), 0.97 (m, 6H). $^{13}$C{$^1$H} NMR (CDCl$_3$): δ (ppm) 155.2, 155.2, 155.2, 153.7, 153.6, 150.2, 147.3, 147.3, 147.3, 135.2, 135.1, 127.6, 127.6, 121.2, 120.5, 113.4, 113.3, 105.5, 104.8, 57.6, 57.6, 57.5, 55.4, 37.1, 36.8, 33.9, 31.1, 29.6, 29.6, 25.8, 23.8, 22.9. $^{31}$P NMR (CDCl$_3$): δ (ppm) 44.0 (d, $^1J_{HP}$=436 Hz). Anal. Calc for C$_{62}$H$_{100}$O$_4$P$_2$Cl$_6$Pd$_2$: C 53.31; H 7.22; N 0.00. Found: C 53.34; H 7.29; N 0.00. Pd Assay w/w % Calc: 15.24. Found 15.09.

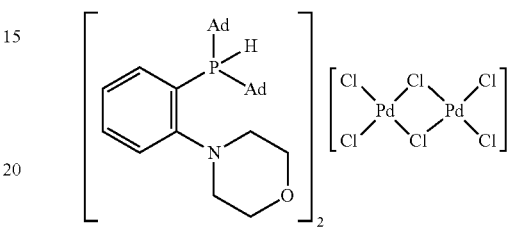

[HMorDalPhos]$_2$[Pd$_2$Cl$_6$]: Following general procedure A, H$_2$PdCl$_4$ solution (0.117 g Pd, 1.10 mmol) and MorDalPhos (0.500 g, 1.08 mmol) are reacted in acetone (10 mL) at rt for 110 min. The resulting suspension is filtered, washed and dried to afford [HMorDalPhos]$_2$[Pd$_2$Cl$_6$] (0.663 g, 94%) as brown solids. $^1$H NMR (CD$_3$CN): δ (ppm) 7.88 (t, J=7.8 Hz, 1H), 7.82 (t, J=8.9 Hz, 1H), 7.74 (dd, J=8.0, 4.6 Hz, 1H), 7.56 (td, J=7.8, 2.2 Hz, 1H), 6.78 (d, $^1J_{HP}$=482.4 Hz, 1H), 3.86 (t, J=4.5 Hz, 4H), 2.90 (m, 4H), 2.20 (s, 24H), 1.81 (s, 6H). $^{13}$C{$^1$H} NMR (CD$_3$CN): δ (ppm) 158.5, 136.7, 136.6, 134.7, 134.6, 127.4, 127.3, 126.4, 126.3, 112.6, 111.8, 78.8, 66.9, 54.4, 39.4, 39.1, 39.0, 38.9, 35.6, 35.6, 28.4, 28.3. $^{31}$P NMR (CD$_3$CN): δ (ppm) 16.16 (d, $^1J_{HP}$=483 Hz). Anal. Calc for C$_{60}$H$_{86}$O$_2$N$_2$P$_2$Cl$_6$Pd$_2$: C 53.19; H 6.40; N 2.07. Found: C 52.90; H 6.31; N 1.98.

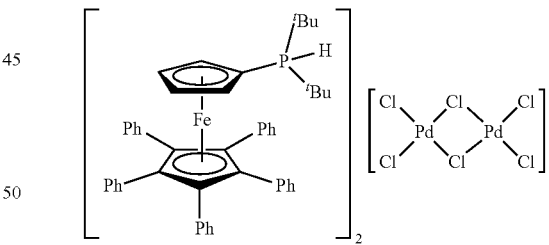

[HQPhos]$_2$[Pd$_2$Cl$_6$]: Following general procedure A, H$_2$PdCl$_4$ solution (0.301 g Pd, 2.83 mmol) and QPhos (2.00 g, 2.81 mmol) are reacted in acetone (15 mL) at rt for 45 min. The resulting suspension is filtered, washed and dried to afford [HQPhos]$_2$[Pd$_2$Cl$_6$] as red solids (2.28 g, 87%). $^1$H NMR (CD$_3$CN): δ (ppm) 7.28 (m, 10H), 7.19 (m, 5H), 7.13 (m, 10H), 6.11 (d, $^1J_{HP}$=467.4 Hz, 1H), 5.31 (m, 2H), 5.10 (m, 2H), 1.17 (s, 9H), 1.12 (s, 9H). $^{13}$C{$^1$H} NMR (CD$_3$CN): δ (ppm) 135.1, 133.6, 128.4, 128.2, 91.1, 80.3, 62.5, 61.7, 35.8, 28.4. $^{31}$P NMR (CD$_3$CN): δ (ppm) 41.1 (m, $^1J_{HP}$=467.6 Hz). Anal. Calc for C$_{96}$H$_{96}$Fe$_2$P$_2$Cl$_6$Pd$_2$: C 62.36; H 5.23; N 0.00. Found: C 61.95; H 5.47; N 0.00.

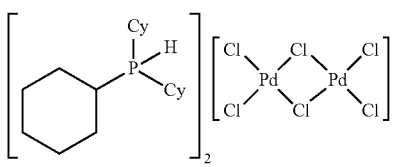

[HPCy$_3$]$_2$[Pd$_2$Cl$_6$]: Following general procedure A, H$_2$PdCl$_4$ solution (0.404 g Pd, 3.79 mmol) and PCy$_3$ (1.05 g, 3.75 mmol) are reacted in acetone (25 mL) at rt for 45 min. The resulting suspension is filtered, washed and dried to afford [HPCy$_3$]$_2$[Pd$_2$Cl$_6$] and (PCy$_3$)PdCl$_2$ in approximately 9:1 ratio. $^1$H NMR (CDCl$_3$): δ (ppm) 7.31 (d, $^1J_{HP}$=473.9 Hz, 1H), 2.77 (m, 3H), 2.32 (m, 6H), 2.1-1.2 (m, 24H). $^{31}$P NMR (CDCl$_3$): δ (ppm) 24.3 (m, $^1J_{HP}$=474.0 Hz).

[HPCy$_3$]$_2$[Pd$_2$Cl$_6$] was recrystallised from chloroform to obtain orange plates. The asymmetric unit contains one molecule of HPCy$_3$, half of the Pd$_2$Cl$_6$ moiety and one molecule of chloroform. Empirical formula: C$_{19}$H$_{35}$Cl$_6$PPd; Formula weight: 613.54; Temperature: 100(2) K; Wavelength: 1.54178 Å; Crystal size: 0.150×0.150×0.005 mm; Crystal habit: pale orange plate; Crystal system: Monoclinic; Space group: P2$_1$/n; Unit cell dimensions: a=11.2868(2) Å b=17.1273(4) Å c=13.1224(3) Å α=90° β=93.959(2)° γ=90°; Volume: 2530.67(9) Å$^3$; Z=4; Density (calculated): 1.610 Mg/m$^3$; Absorption coefficient 12.368 mm-1; F(000): 1248; Theta range for data collection: 4.251 to 70.246°; Index ranges: −13≤h≤13, −18≤k≤20, −15≤l≤15; Reflections collected: 24631; Independent reflections: 4779 [R(int) =0.0574]; Coverage of independent reflections: 100.0%; Data/restraints/parameters: 4779/0/248; Goodness-of-fit on F$^2$: 1.040; Δ/σ$_{max}$: 0.001; Final R indices: 4130 data; I>2σ (I)R1=0.0353, wR2=0.0925; all data: R1=0.0427, wR2=0.0992; Δρ: 1.213 and −0.896 eÅ$^{-3}$.

Figure 3:
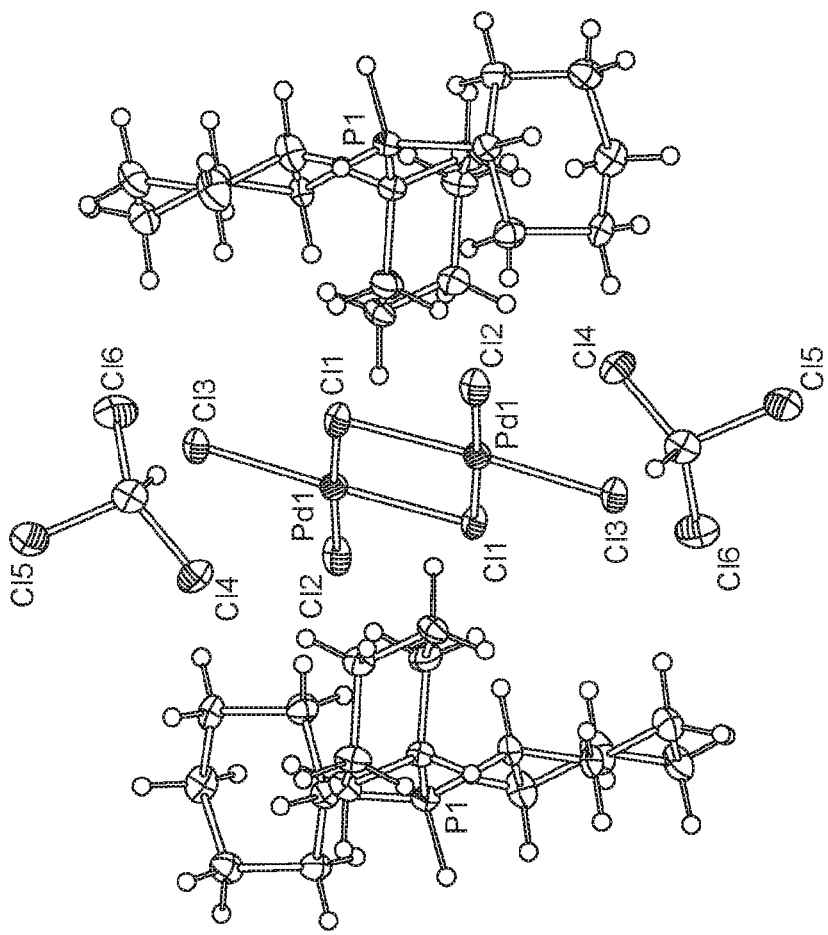
FIG. 3 shows the crystal structure of $[HPCy_3]_2[Pd_2Cl_6]$.

A view of [HPCy$_3$]$_2$[Pd$_2$Cl$_6$] from the crystal structure (grown fragment) is shown in FIG. 3. Anisotropic atomic displacement ellipsoids for the non-hydrogen atoms are shown at the 50% probability level. Hydrogen atoms are displayed with an arbitrarily small radius.

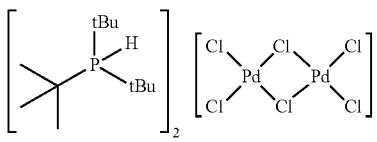

[HP$^t$Bu$_3$]$_2$[Pd$_2$Cl$_6$]: Following general procedure A, H$_2$PdCl$_4$ solution (63 mg Pd, 0.59 mmol) and P$^t$Bu$_3$ (12 wt % in xylenes, 0.96 g, 0.57 mmol) are reacted in acetone (2 mL) at rt for 30 min. Water (2 mL) is added to the mixture and the resulting suspension is filtered, washed and dried to afford [HP$^t$Bu$_3$]$_2$[Pd$_2$Cl$_6$] as red solids. $^1$H NMR (CDCl$_3$): δ (ppm) 7.93 (d, $^1J_{HP}$=461.0 Hz, 1H), 1.91 (d, J=15.2 Hz, 27H), $^{31}$P NMR (CDCl$_3$): δ (ppm) 48.2 (m, $^1J_{HP}$=465.8 Hz).

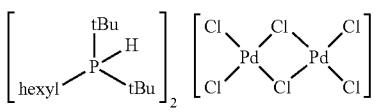

[HP$^t$Bu$_2$$^n$hexyl]$_2$[Pd$_2$Cl$_6$]: Following general procedure A, H$_2$PdCl$_4$ solution (35 mg Pd, 0.33 mmol) and di-tert-butyl(n-hexyl)phosphonium tetrafluoroborate (0.10 g, 0.32 mmol) are reacted in acetone (2 mL) at rt for 30 min. Water (2 mL) is added to the mixture and the product precipitates over 15 min. The resulting suspension is filtered, washed and dried to afford [HP$^t$Bu$_2$$^n$hexyl]$_2$[Pd$_2$Cl$_6$] as orange solids (0.11 g, 75%). $^1$H NMR (CDCl$_3$): δ (ppm) 7.70 (d, $^1J_{HP}$=471.6 Hz, 1H), 2.45 (m, 2H), 2.15 (m, 2H), 1.76 (d, J=16.2 Hz, 18H), 1.61 (m, 2H), 1.40 (m, 4H), 0.91 (t, J=7.0 Hz, 3H). $^{31}$P NMR (CDCl$_3$): δ (ppm) 40.1 (m, $^1J_{HP}$=472.7 Hz).

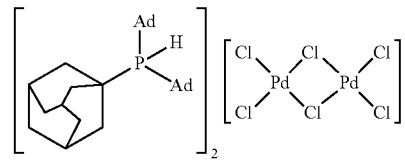

[HPAd$_3$]$_2$[Pd$_2$Cl$_6$]: Following general procedure A, H$_2$PdCl$_4$ solution (31 mg Pd, 0.29 mmol) and PAd$_3$ (125 mg, 0.29 mmol) are reacted in acetone (4 mL) at rt for 60 min. The resulting suspension is filtered, washed and dried to afford [HPAd$_3$]$_2$[Pd$_2$Cl$_6$] as orange solids (136 mg, 72%). $^1$H NMR (CDCl$_3$): δ (ppm) 7.28 (d, $^1J_{HP}$=450.2 Hz, 1H), 2.84 (s, 12H), 2.3-2.1 (m, 13H), 2.02 (m, 6H), 1.82 (m, 6H), 1.66 (m, 8H). $^{31}$P NMR (CDCl$_3$): δ (ppm) 25.9 (m, $^1J_{HP}$=447.7 Hz).

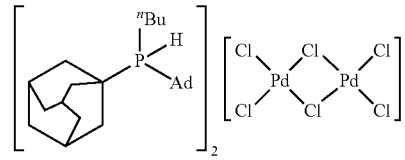

[HCataCXiumA]$_2$[Pd$_2$Cl$_6$]: Following general procedure A, H$_2$PdCl$_4$ solution (39 mg Pd, 0.37 mmol) and CataCXiumA (133 mg, 0.37 mmol) are reacted in acetone (4 mL) at rt for 40 min. Water (1 mL) is added to the mixture and the resulting suspension is filtered, washed and dried to afford [HCataCXiumA]$_2$[Pd$_2$Cl$_6$] as orange solids (148 mg, 68%). $^1$H NMR (CDCl$_3$): δ (ppm) 7.29 (d, $^1J_{HP}$=464.6 Hz, 1H), 2.6-2.4 (m, 11H), 2.25 (s, 4H), 2.1-1.9 (m, 6H), 1.85 (m, 4H), 1.64 (m, 2H), 1.29 (m, 6H), 1.05 (m, 3H), 0.89 (m, 3H). $^{31}$P NMR (CDCl$_3$): δ (ppm) 29.8 (m, $^1J_{HP}$=464.6 Hz).

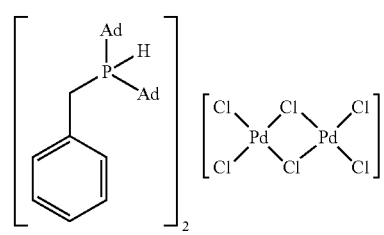

[HCataCXiumABn]$_2$[Pd$_2$Cl$_6$]: Following general procedure A, H$_2$PdCl$_4$ solution (38 mg Pd, 0.36 mmol) and CataCXiumABn (137 mg, 0.35 mmol) are reacted in acetone (2 mL) at rt for 40 min. The resulting suspension is filtered, washed and dried to afford [HCataCXiumABn]$_2$[Pd$_2$Cl$_6$] as beige solids (175 mg, 82%). $^1$H NMR (CDCl$_3$): δ (ppm) 7.5-7.3 (m, 5H), 5.58 (dt, $^1J_{HP}$=457.2 Hz, $^3J_{HH}$=5.5 Hz, 1H), 3.73 (dd, J=12.7, 5.5 Hz, 2H), 2.2-2.0 (m, 18H), 1.84 (m, 12H). $^{31}$P NMR (CDCl$_3$): δ (ppm) 37.5 (m, $^1J_{HP}$=458.0 Hz).

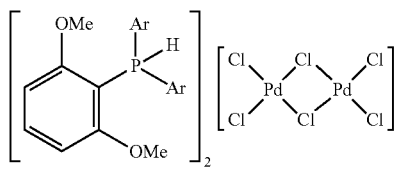

[HP(2,6-dimethoxyphenyl)$_3$]$_2$[Pd$_2$Cl$_6$]: Following general procedure A, H$_2$PdCl$_4$ solution (0.13 g Pd, 1.16 mmol) and tris(2,6-dimethoxyphenyl)phosphine (0.51 g, 1.16 mmol) are reacted in acetone (4 mL) at rt for 60 min. The resulting suspension is filtered, washed and dried to afford [HP(2,6-dimethoxyphenyl)$_3$]$_2$[Pd$_2$Cl$_6$] as orange solids (0.667 g, 87%). $^1$H NMR (CD$_3$CN): δ (ppm) 8.53 (d, $^1J_{HP}$=548.5 Hz, 1H), 7.64 (t, J=8.4 Hz, 3H), 6.76 (d, J=8.4 Hz, 3H), 6.74 (d, J=8.5 Hz, 3H), 3.67 (s, 18H). $^{31}$P NMR (CD$_3$CN): δ (ppm) −51.1 (d, $^1J_{HP}$=548.7 Hz). (Ar=2,6-dimethoxyphenyl)

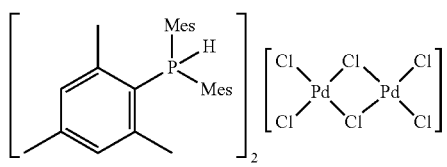

[HP(2,4,6-trimethylphenyl)$_3$]$_2$[Pd$_2$Cl$_6$]: Following general procedure A, H$_2$PdCl$_4$ solution (0.11 g Pd, 1.07 mmol) and tris(2,4,6-trimethylphenyl)phosphine (0.41 g, 1.06 mmol) are reacted in acetone (6 mL) at rt for 30 min. Water (5 mL) is added to the mixture and the resulting suspension is filtered, washed and dried to afford [HP(2,4,6-trimethylphenyl)$_3$]$_2$[Pd$_2$Cl$_6$] as red solids (0.52 g, 81%). Mother liquor and acetone washings were combined and concentrated to furnish orange crystals. $^1$H NMR (CDCl$_3$): δ (ppm) 8.81 (d, $^1J_{HP}$=499.3 Hz, 1H), 7.15 (m, br, 6H), 2.66 (s, br 9H), 2.41 (s, 9H), 2.04 (s, 9H). $^{31}$P NMR (CDCl$_3$): δ (ppm) −26.4 (d, $^1J_{HP}$=499.5.7 Hz).

Asymmetric unit contains two independent molecules of HP(2,4,6-trimethylphenyl)$_3$ and one Pd$_2$Cl$_6$ moiety. Empirical formula: C$_{27}$H$_{34}$Cl$_3$PPd; Formula weight: 602.26; Temperature: 100(2) K; Wavelength: 1.54178 Å; Crystal size: 0.180×0.060×0.060 mm; Crystal habit: dark orange fragment; Crystal system: Monoclinic; Space group: P2$_1$/c; Unit cell dimensions: a=14.43655(17) Å b=25.5543(3) Å c=15.31900(19) Å α=90° β=108.3280(13) ° γ=90°; Volume: 5364.73(12) Å$^3$; Z=8; Density (calculated): 1.491 Mg/m$^3$; Absorption coefficient: 8.985 mm-1; F(000): 2464; Theta range for data collection: 3.459 to 70.251°; Index ranges: −17≤h≤14, −30≤k≤30, −18≤l≤18; Reflections collected: 53878; Independent reflections: 10155 [R(int)=0.0521]; Coverage of independent reflections: 99.9%; =Data/restraints/parameters: 10155/0/603; Goodness-of-fit on F2: 1.051; Δ/σ$_{max}$: 0.004; Final R indices 8700 data; I>2σ(I) R1=0.0304, wR2=0.0714; all data: R$_{1=0.0391}$, wR2= 0.0769; =Δρ: 0.633 and −0.419 eÅ$^{-3}$.

Figure 4:
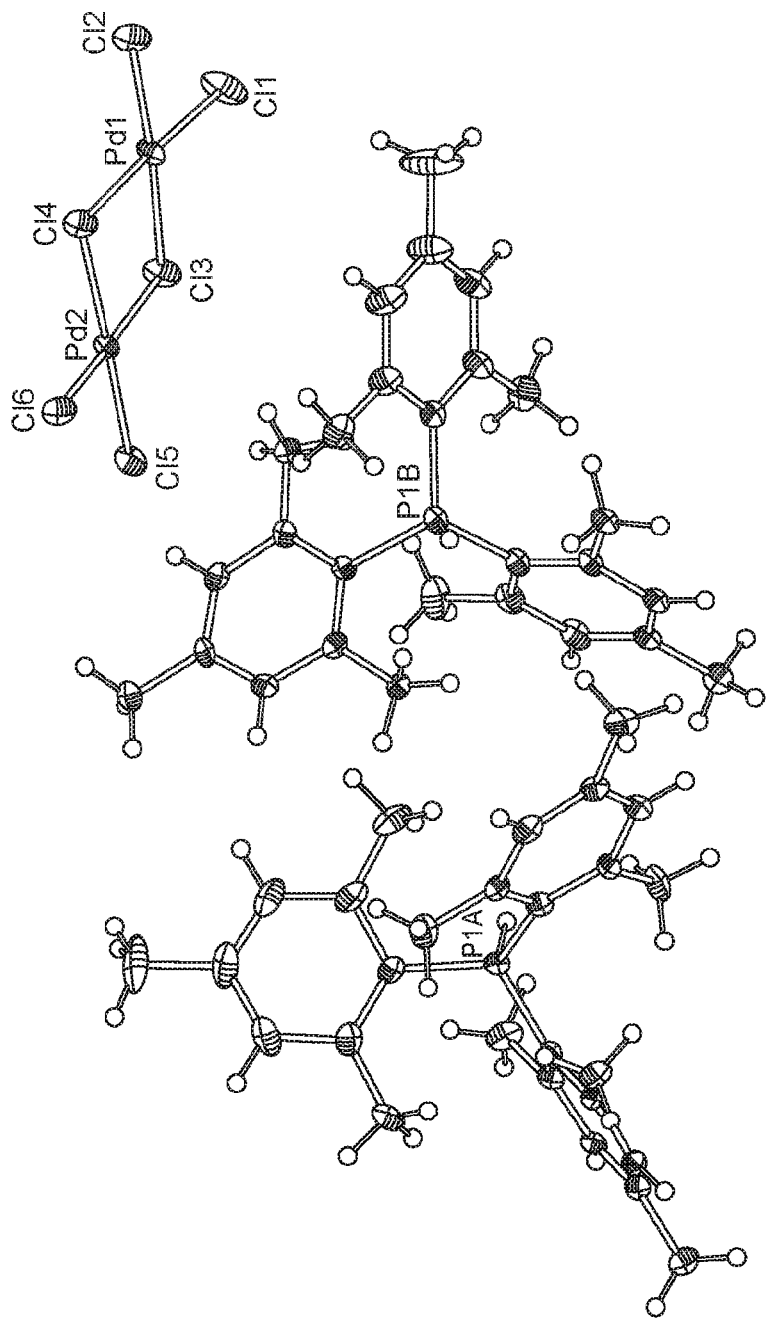
FIG. 4 shows the crystal structure of $[HP(2,4,6\text{-trimethylphenyl})_3]_2[Pd_2Cl_6]$.

A view of [HP(2,4,6-trimethylphenyl)$_3$]$_2$[Pd$_2$Cl$_6$] from the crystal structure (asymmetric part is) is shown in FIG. 4. Anisotropic atomic displacement ellipsoids for the non-hydrogen atoms are shown at the 50% probability level. Hydrogen atoms are displayed with an arbitrarily small radius.

Example 2: α-Arylation of Ketones

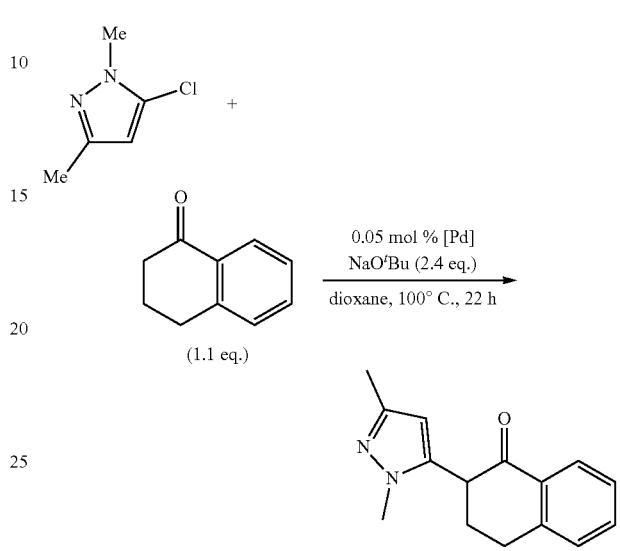

A 4 mL vial quipped with a stir bar and polypropylene cap with PTFE-faced silicone septum was charged with catalyst and NaO$^t$Bu (2.5 mmol) in the glovebox. On the bench 5-chloro-1,5-dimethyl pyrazole (1.0 mmol), 1-tetralone (1.3 mmol) and dioxane (2 mL) were added via needle. The vials were placed in a pre-heated aluminium block at 100° C. and stirred for 22 hours. After cooling to room temperature an aliquot was diluted in ethyl acetate and filtered for GC analysis.

| Example | [Pd] | GC Yield % * |
|---|---|---|
| 2a (not of the invention) | Pd-132 | 73 |
| 2b (not of the invention) | AmPhos G3 | 78 |
| 2c | [HAmPhos]$_2$[Pd$_2$Cl6] | 79 |

* average conversion over 2 runs

Example 3: Heck Alkynylation of Heteroaryl Chloride

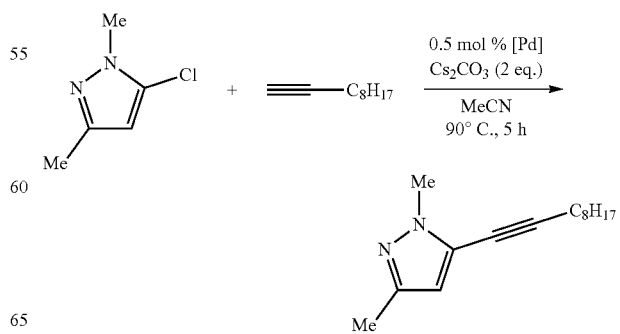

A 4 mL vial equipped with a stir bar and polypropylene cap with PTFE-faced silicone septum was charged with catalyst and CsCO₃ (2.2 mmol) in the glovebox. On the bench 5-chloro-1,5-dimethylpyrazole (1.0 mmol), 1-decyne (1.3 mmol) and acetonitrile (2 mL) were added via needle. The vials were placed in a pre-heated aluminium block at 90° C. and stirred for 5 h. After cooling to room temperature an aliquot was diluted in ethyl acetate and filtered for GC analysis.

| Example | [Pd] | GC Yield % * |
|---|---|---|
| 3a (not of the invention) | Pd-161 | 10 |
| 3b (not of the invention) | AmPhos G3 | 20 |
| 3c | [HAmPhos]₂[Pd₂Cl₆] | 9 |
| 3d (not of the invention) | Pd-171 | 14 |
| 3e (not of the invention) | RuPhos G3 | 11 |
| 3f | [HRuPhos]₂[Pd₂Cl₆] | 23 |
| 3g (not of the invention) | Pd-170 | 25 |
| 3h (not of the invention) | XPhos G3 | 21 |
| 3i | [HXPhos]₂[Pd₂Cl₆] | 53 |
| 3j (not of the invention) | Pd-173 | 77 |
| 3k (not of the invention) | BrettPhosG3 | 16 |
| 3l | [HBrettPhos]₂[Pd₂Cl₆] | 76 |

* average conversion over 2 runs

Example 4: Suzuki-Miyaura Coupling of Heteroaryl Chloride

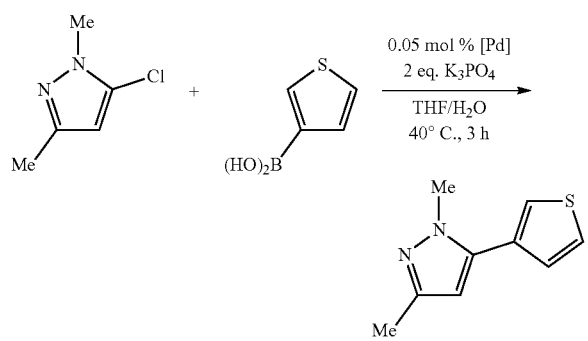

A 4 mL vial equipped with a stir bar and polypropylene cap with PTFE-faced silicone septum was charged with catalyst and K₃PO₄ (3.1 mmol) and 3-thienylboronic acid (2.3 mmol) in the glovebox. On the bench 5-chloro-1,5-dimethylpyrazole (1.5 mmol), THF (1.0 mL) and water (2.0 mL) were added via needle. The vials were placed in a pre-heated aluminium block at 40° C. and stirred for 3 h. After cooling to room temperature an aliquot was diluted in ethyl acetate and filtered for GC analysis.

| Example | [Pd] | GC Yield % * |
|---|---|---|
| 4a (not of the invention) | Pd-170 | 60 |
| 4b (not of the invention) | XPhos G4 | 59 |
| 4c (not of the invention) | XPhos G3 | 61 |
| 4d (not of the invention) | Pd-111 + XPhos | 56 |
| 4e | [HXPhos]₂[Pd₂Cl₆] | 64 |

* average conversion over 2 runs

Example 5: Amination of 4-Chloroanisole

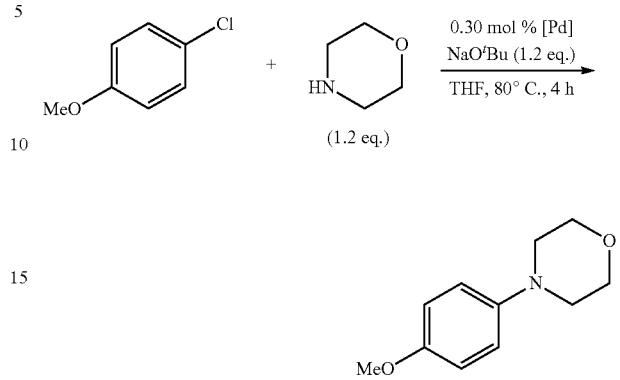

A 4 mL vial equipped with a stir bar and polypropylene cap with PTFE-faced silicone septum was charged with catalyst and NaO$^t$Bu (2.4 mmol) in the glovebox. On the bench 4-chloroanisole (2.0 mmol), morpholine (2.4 mmol) and THF (2 mL) were added via needle. The vials were placed in a pre-heated aluminium block at 80° C. and stirred for 4 h. After cooling to room temperature an aliquot was diluted in acetonitrile and filtered for GC analysis.

| Example | [Pd] | GC Yield % * |
|---|---|---|
| 5a (not of the invention) | Pd-170 | >99 |
| 5b (not of the invention) | XPhos G3 | 29 |
| 5c | [HXPhos]₂[Pd₂Cl₆] | >99 |

* average conversion over 2 runs

Catalysts Used in the Comparative Examples (Commercially Available or Available from Johnson Matthey PLC)

Pd-111: Palladium acetate

Pd-132: PdCl₂(AmPhos)₂

Pd-161: AmPhos Pd(crotyl)Cl

Pd-170: XPhos Pd(crotyl)Cl

Pd-171: RuPhos Pd(crotyl)Cl

Pd-173: [BrettPhos Pd(crotyl)]OTf

G3 Palladacycles:

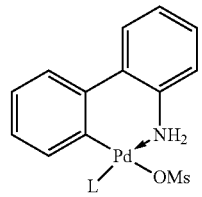

AmPhos G3: L=AmPhos

RuPhos G3: L=RuPhos

XPhos G3: L=XPhos

BrettPhos G3: L=BrettPhos

G4 Palladacycles:

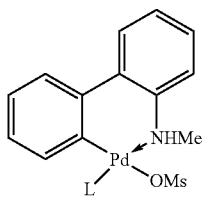

AmPhos G4: L=AmPhos
XPhos G4: L=XPhos

Further aspects and features of the present invention are set out in the following numbered clauses:

1. A compound of formula (I)

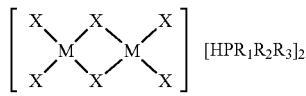

wherein M is Pd(II) or Ni(II);

X is a halide;

$R_1$ and $R_2$ are independently organic groups having 1-20 carbon atoms, or $R_1$ and $R_2$ are linked to form a ring structure with the phosphorus atom;

$R_3$ is an organic group having 1-20 carbon atoms;

provided that $R_1$, $R_2$, $R_3$ are not each phenyl.

2. A compound according to clause 1, wherein M is Pd.

3. A compound according to clause 1 or 2, wherein X is Cl, Br or I.

4. A compound according to clause 3, wherein X is Cl or Br.

5. A compound according to any preceding clause, wherein $R_1$ and $R_2$ are the same.

6. A compound according to any one of clauses 1 to 4, wherein $R_1$ and $R_2$ are different.

7. A compound according to any preceding clause, wherein $R_1$ and $R_2$ are linked to form a ring structure with the P atom to which they are attached.

8. A compound according to clause 7, wherein the ring structure is a 4-7 membered ring.

9. A compound according to any preceding clause, wherein $R_1$ and $R_2$ are independently selected from the group consisting of alkyl, cycloalkyl, aryl, and heteroaryl wherein the heteroatoms are independently selected from sulphur, nitrogen and oxygen.

10. A compound according to clause 9, wherein $R_1$ and $R_2$ are independently selected from the group consisting of alkyl, cycloalkyl and aryl.

11. A compound according to clause 9 or 10, wherein the alkyl group is selected from methyl, ethyl, n-propyl, iso-propyl, n-butyl, iso-butyl, sec-butyl, tert-butyl, pentyl (e.g. n-pentyl or neopentyl), hexyl, heptyl, octyl, nonyl, decyl, dodecyl or stearyl.

12. A compound according to any one of clauses 9 to 11, wherein the cycloalkyl group is selected from cyclopropyl, cyclobutyl, cyclopentyl, cyclohexyl or adamantyl 13. A compound according to any one of clauses 9 to 12, wherein the aryl group is selected from phenyl, naphthyl or anthracyl.

14. A compound according to any one of clauses 9 to 13, wherein the heteroaryl group is pyridyl.

15. A compound according to any one of clauses 1 to 8, wherein $R_1$ and $R_2$ are independently selected from the group consisting of n-propyl, iso-propyl, n-butyl, iso-butyl, sec-butyl, tert-butyl, pentyl (e.g. n-pentyl or neopentyl), hexyl, cyclopentyl, cyclohexyl or adamantyl and phenyl.

16. A compound according to clause 15, wherein $R_1$ and $R_2$ are independently selected from the group consisting of tert-butyl, n-butyl, cyclohexyl, adamantyl, 2,4,6-trimethylphenyl and 2,6-dimethoxyphenyl.

17. A compound according to any preceding clause, wherein $R_3$ is selected from the group consisting of alkyl, cycloalkyl, aryl, heteroaryl and metallocenyl.

18. A compound according to clause 17, wherein $R_3$ is alkyl.

19. A compound according to clause 18, wherein $R_3$ is methyl, ethyl, n-propyl, iso-propyl, n-butyl, iso-butyl, sec-butyl, tert-butyl, pentyl (e.g. n-pentyl or neopentyl), hexyl, heptyl, octyl, nonyl, decyl, dodecyl or stearyl.

20. A compound according to clause 18 or 19, wherein $R_3$ is optionally substituted with one or more substituents which may be the same or different.

21. A compound according to clause 20, wherein the substituents are independently selected from halide, alkoxy groups (e.g. methoxy, ethoxy or propoxy) or aryl (e.g. phenyl).

22. A compound according to any one of clause 18 to 21, wherein $R_3$ is t-butyl, hexyl or benzyl.

23. A compound according to clause 17, wherein $R_3$ is cycloalkyl.

24. A compound according to clause 23, wherein $R_3$ is cyclopropyl, cyclobutyl, cyclopentyl, cyclohexyl or adamantyl.

25. A compound according to clause 24, wherein $R_3$ is cyclohexyl or adamantyl.

26. A compound according to clause 17, wherein $R_3$ is aryl.

27. A compound according to clause 26, wherein $R_3$ is a group of formula (II)

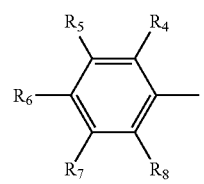

wherein, $R_4$, $R_5$, $R_6$, $R_7$ and $R_8$ are independently hydrogen, or organic groups having 1-20 carbon atoms and are selected up to limitation imposed by stability and the rules of valence.

28. A compound according to clause 27, wherein $R_4$, $R_5$, $R_6$, $R_7$ and $R_8$ are independently selected from the group consisting of hydrogen, alkyl, cycloalkyl, heterocycloalkyl, alkoxy, aryl, heteroaryl, —N(alkyl)$_2$ (wherein the alkyl groups may be the same or different and are independently selected from straight-chain or branched-chain groups), —N(cycloalkyl)$_2$ (wherein the cycloalkyl groups may be the same or different), —N(aryl)$_2$ (wherein the aryl groups may be the same or different), —N(heteroaryl)$_2$ (wherein the heteroaryl groups may be the same or different) and heterocycloalkyl groups.

29. A compound according to clause 28, wherein $R_4$, $R_5$, $R_6$, $R_7$ and $R_8$ are independently selected from the group consisting of hydrogen, alkyl, heterocycloalkyl, alkoxy, aryl and —N(alkyl)₂ (wherein the alkyl groups may be the same or different and are independently selected from straight-chain or branched-chain groups).

30. A compound according to clause 28 or 29, wherein the alkyl groups are selected from the group methyl, ethyl, n-propyl, iso-propyl, n-butyl, iso-butyl, sec-butyl, tert-butyl, pentyl (e.g. n-pentyl or neopentyl), hexyl, heptyl, octyl, nonyl, decyl, dodecyl or stearyl.

31. A compound according to clause 30, wherein the alkyl groups are selected from the group methyl, ethyl, n-propyl, iso-propyl, n-butyl, iso-butyl, sec-butyl, tert-butyl.

32. A compound according to clause 31, wherein the alkyl groups are selected from the group methyl, ethyl, n-propyl, iso-propyl.

33. A compound according to clause 32, wherein the alkyl groups are selected from the group methyl or ethyl.

34. A compound according to any one of clauses 28 to 33, wherein the heterocycloalkyl groups are selected from the group epoxide, morpholinyl, piperadinyl, piperaxinyl, thirranyl, pyrrolidinyl, pyrazolidinyl, imazolidinyl, thiazonidinyl, thiomorpholinyl.

35. A compound according to clause 34, wherein the heterocycloalkyl group is morpholinyl.

36. A compound according to any one of clauses 28 to 35, wherein the alkoxy groups are selected from the group methoxy, ethoxy, n-propoxy, iso-propoxy, n-butoxy, iso-butoxy, sec-butoxy, tert-butoxy, —O-pentyl, —O-hexyl, —O-heptyl, —O-octyl, —O-nonyl, —O-decyl, -0-dodecyl.

37. A compound according to clause 36, wherein the alkoxy groups are selected from the group methoxy, ethoxy, n-propoxy, iso-propoxy, n-butoxy, iso-butoxy, sec-butoxy, tert-butoxy.

38. A compound according to clause 37, wherein the alkoxy groups are selected from the group methoxy, ethoxy, n-propoxy, iso-propoxy.

39. A compound according to clause 38, wherein the alkoxy group is methoxy.

40. A compound according to any one of clauses 28 to 39, wherein the aryl groups are selected from the group phenyl, naphthyl and anthracenyl.

41. A compound according to clause 40, wherein the aryl group is phenyl.

42. A compound according to clause 40 or 41, wherein the aryl group is optionally substituted with one or more substituents each of which may be the same of different and are selected from the group alkyl, cycloalkyl, alkoxy, aryl, heteroaryl, —N(alkyl)₂ (wherein the alkyl groups may be the same or different and are independently selected from straight-chain or branched-chain groups), —N(cycloalkyl)₂ (wherein the cycloalkyl groups may be the same or different), —N(aryl)₂ (wherein the aryl groups may be the same or different), —N(heteroaryl)₂ (wherein the heteroaryl groups may be the same or different) and heterocycloalkyl groups.

43. A compound according to clause 42, wherein the substituents are independently selected from the group alkyl or alkoxy.

44. A compound according to clause 43, wherein the substituted aryl group is 2,6-dimethoxyphenyl, 2,6-di isopropoxyphenyl and 2,4,6-triisopropylphenyl.

45. A compound according to any one of clauses 28 to 44, wherein the —N(alkyl)₂ groups are selected from the group —NMe₂, —NEt₂, —N(n-Pr)₂ or —N(i-Pr)₂.

46. A compound according to clause 27, wherein R₄, R₅, R₆ and R₇ are independently selected from the group consisting of hydrogen, alkyl, heterocycloalkyl, alkoxy, aryl and —N(alkyl)₂ (wherein the alkyl groups may be the same or different and are independently selected from straight-chain or branched-chain groups), suitably, hydrogen or alkoxy and R₈ is an aryl of formula (III)

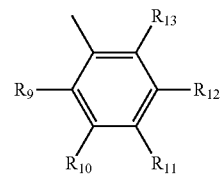

wherein R₉, R₁₀, R₁₁, R₁₂ and R₁₃ are independently selected from the group consisting of hydrogen, alkyl, cycloalkyl, alkoxy, aryl, heteroaryl, —N(alkyl)₂ (wherein the alkyl groups may be the same or different and are independently selected from straight-chain or branched-chain groups), —N(cycloalkyl)₂ (wherein the cycloalkyl groups may be the same or different), —N(aryl)₂ (wherein the aryl groups may be the same or different), —N(heteroaryl)₂ (wherein the heteroaryl groups may be the same or different) and heterocycloalkyl groups.

47. A compound according to clause 46, wherein R₉, R₁₀, R₁₁, R₁₂ and R₁₃ are independently selected from the group consisting of hydrogen, alkyl and alkoxy.

48. A compound according to clause 27, wherein R₄, R₅, R₆ and R₇ may be independently selected from the group consisting of hydrogen, alkyl, heterocycloalkyl, alkoxy, aryl and —N(alkyl)₂ (wherein the alkyl groups may be the same or different and are independently selected from straight-chain or branched-chain groups), suitably, hydrogen or alkoxy and R₈ is an unsubstituted heterocycloalkyl group.

49. A compound according to clause 48, wherein R₈ is a C₄₋₈ heterocycloalkyl.

50. A compound according to clause 49, wherein R₈ is piperidinyl or morpholinyl.

51. A compound according to clause 50, wherein R₈ is morpholinyl.

52. A compound according to clause 27, wherein R₄, R₅, R₆ and R₇ may be independently selected from the group consisting of hydrogen, alkyl, heterocycloalkyl, alkoxy, aryl and —N(alkyl)₂ (wherein the alkyl groups may be the same or different and are independently selected from straight-chain or branched-chain groups), suitably, hydrogen or alkoxy and R₈ is hydrogen.

53. A compound according to clause 17, wherein R₃ is heteroaryl.

54. A compound according to clause 17, wherein R₃ is metallocenyl.

55. A compound according to clause 54, wherein R₃ is ferrocenyl.

56. A compound according to any one of clauses 1 to 4, wherein PR₁R₂R₃ is selected from the group:

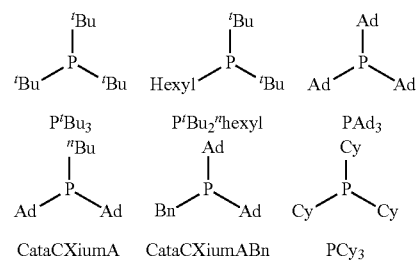

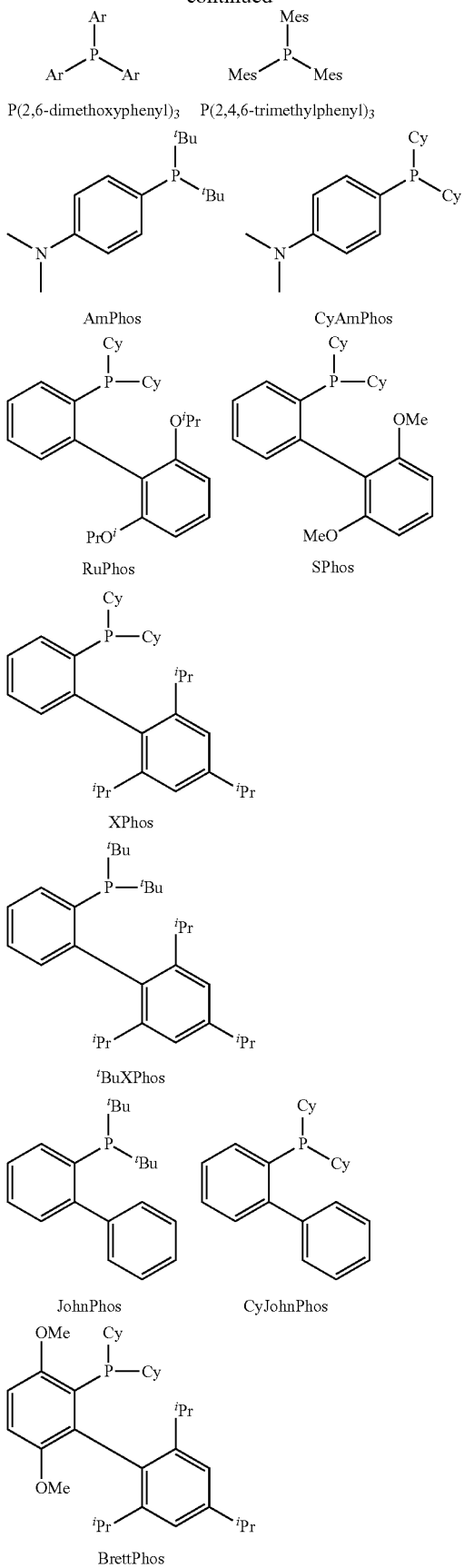
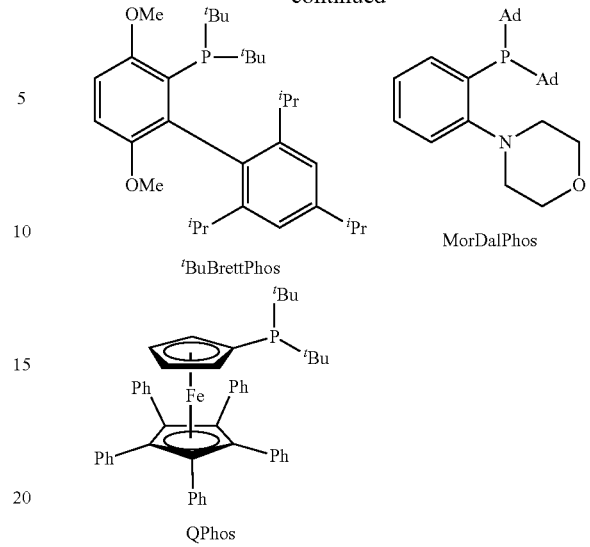

Ad=adamantyl
Cy=cyclohexyl
Bn=benzyl
Ar=2,6 dimethoxyphenyl
Mes=2,4,6-trimethylphenyl 57. A process for the preparation of a compound of formula (IA)

$$[M_2Cl_6][HPR_1R_2R_3]_2 \quad (IA)$$

wherein M, $R_1$, $R_2$ and $R_3$ are as hereinbefore defined, said process comprising the step of reacting a compound of formula $H_2PdCl_4$ with ligand $PR_1R_2R_3$ or a salt thereof.

58. A process for the preparation of a compound of formula (IB)

$$[M_2X'_6][HPR_1R_2R_3]_2 \quad (IB)$$

wherein M, $R_1$, $R_2$ and $R_3$ are as hereinbefore defined and X' is bromide, iodide or fluoride (suitably bromide), said process comprising the step of reacting a compound of formula $H_2PdCl_4$ with ligand $PR_1R_2R_3$ or a salt thereof and a compound ZX' wherein Z is hydrogen or a monovalent metal ion, such as Li or K.

59. A process for carrying out a carbon-carbon coupling reaction in the presence of a catalyst, the process comprising the use of a compound according to any one of clauses 1 to 56.

60. The use of a compound according to any one of clauses 1 to 56 to catalyse a carbon-carbon coupling reaction.

61. A process for carrying out a carbon-heteroatom coupling reaction in the presence of a catalyst, the process comprising the use of a compound according to any one of clauses 1 to 56.

62. The use of a compound according to any one of clauses 1 to 56 to catalyse a carbon-heteroatom coupling reaction.

The invention claimed is:
1. A compound of formula (I)

$$\begin{bmatrix} X & X & X \\ & M & M & \\ X & X & X \end{bmatrix} [HPR_1R_2R_3]_2 \quad (I)$$

wherein M is Pd(II) or Ni(II);

X is a halide;

R₁ and R₂ are independently organic groups having 1-20 carbon atoms, or R₁ and R₂ are linked to form a ring structure with the phosphorus atom;

R₃ is an organic group having 1-20 carbon atoms;

provided that R₁, R₂, R₃ are not each phenyl.

2. The compound according to claim 1, wherein M is Pd.

3. The compound according to claim 1, wherein X is Cl, Br or I.

4. The compound according to claim 1, wherein X is Cl or Br.

5. The compound according to claim 1, wherein R₁ and R₂ are independently selected from the group consisting of alkyl, cycloalkyl, aryl, and heteroaryl wherein the heteroatoms are independently selected from sulphur, nitrogen and oxygen.

6. The compound according to claim 1, wherein R₁ and R₂ are independently selected from the group consisting of alkyl, cycloalkyl and aryl.

7. The compound according to claim 1, wherein R₃ is selected from the group consisting of alkyl, cycloalkyl, aryl, heteroaryl and metallocenyl.

8. The compound according to claim 1, wherein PR₁R₂R₃ is selected from the group:

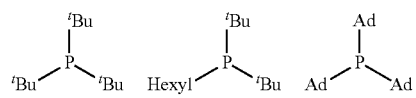

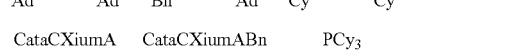

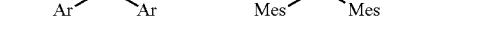

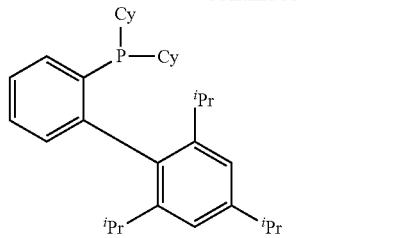

XPhos

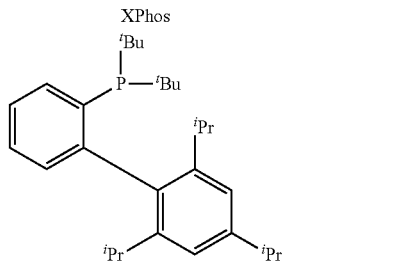

ᵗBuXPhos

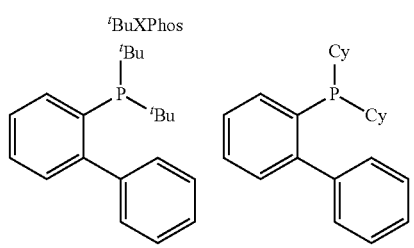

JohnPhos    CyJohnPhos

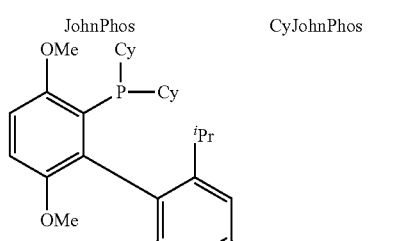

BrettPhos

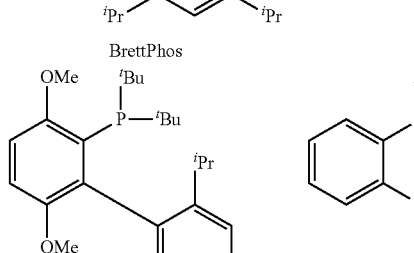

ᵗBuBrettPhos    MorDalPhos

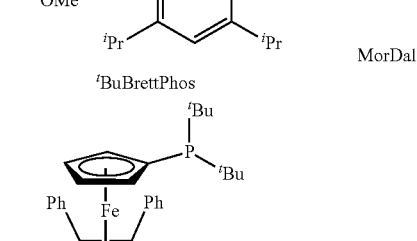

QPhos

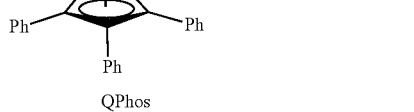

Ad=adamantyl
Cy=cyclohexyl
Bn=benzyl

Ar=2,6 dimethoxyphenyl
Mes=2,4,6-trimethylphenyl.

9. A process for the preparation of a compound of formula (IA)

$$[M_2Cl_6][HPR_1R_2R_3]_2 \quad (IA)$$

wherein M is Pd(II) or Ni(II);

$R_1$ and $R_2$ are independently organic groups having 1-20 carbon atoms, or $R_1$ and $R_2$ are linked to form a ring structure with the phosphorus atom;

and $R_3$ is an organic group having 1-20 carbon atoms provided that $R_1$, $R_2$, and $R_3$ are not each phenyl, said process comprising the step of reacting a compound of formula $H_2PdCl_4$ with ligand $PR_1R_2R_3$ or a salt thereof.

10. A process for the preparation of a compound of formula (IB)

$$[M_2X'_6][HPR_1R_2R_3]_2 \quad (IB)$$

wherein M is Pd(II) or Ni(II);

$R_1$ and $R_2$ are independently organic groups having 1-20 carbon atoms, or $R_1$ and $R_2$ are linked to form a ring structure with the phosphorus atom;

$R_3$ is an organic group having 1-20 carbon atoms provided that $R_1$, $R_2$, and $R_3$ are not each phenyl;

and X' is bromide, iodide or fluoride, said process comprising the step of reacting a compound of formula $H_2PdCl_4$ with ligand $PR_1R_2R_3$ or a salt thereof and a compound ZX' wherein Z is hydrogen or a monovalent metal ion.

11. A process for carrying out a carbon-carbon coupling reaction comprising a step of contacting a compound according to claim 1 as a catalyst to a mixture of reactants.

12. A process for carrying out a carbon-heteroatom coupling reaction comprising a step of contacting a compound according to claim 1 as a catalyst to a mixture of reactants.

* * * * *